(12) United States Patent
Saraswat et al.

(10) Patent No.: US 11,212,180 B2
(45) Date of Patent: Dec. 28, 2021

(54) CONFIGURING A DEVICE TO HAVE CERTIFICATE(S) BY ORDERING ASYNCHRONOUS WORK REQUESTS

(71) Applicant: Microsoft Technology Licensing, LLC, Redmond, WA (US)

(72) Inventors: Rohit Saraswat, Draper, UT (US); Juan Carlos Luciani, Sr., Highland, UT (US); Harsha Vardhan Palakurthi, Lehi, UT (US); Jeffrey Scott Pinkston, Draper, UT (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/917,789

(22) Filed: Jun. 30, 2020

(65) Prior Publication Data

US 2021/0359911 A1 Nov. 18, 2021

Related U.S. Application Data

(60) Provisional application No. 63/025,972, filed on May 15, 2020.

(51) Int. Cl.
*H04L 12/24* (2006.01)
*H04L 29/06* (2006.01)
(Continued)

(52) U.S. Cl.
CPC ........ *H04L 41/0893* (2013.01); *H04L 41/044* (2013.01); *H04L 63/0272* (2013.01);
(Continued)

(58) Field of Classification Search
CPC ............... H04L 41/044; H04L 41/0893; H04L 63/0272; H04L 63/0823; H04L 9/3263; H04W 12/37; H04W 12/069
See application file for complete search history.

(56) References Cited

U.S. PATENT DOCUMENTS 6,711,616 B1 * 3/2004 Stamm ................. G06F 9/5066
709/226
8,015,600 B2 * 9/2011 Sinn .................... H04L 63/0823
726/10
(Continued)

FOREIGN PATENT DOCUMENTS

| CN | 103259799 A | * | 8/2013 | |
| EP | 2173058 A1 | * | 4/2010 | ........... H04L 9/3247 |
| WO | 02052379 A2 | | 7/2002 | |

OTHER PUBLICATIONS

"International Search Report and Written Opinion Issued in PCT Application No. PCT/US2021/030981", dated Jul. 16, 2021, 22 Pages.

*Primary Examiner* — Kostas J Katsikis
(74) *Attorney, Agent, or Firm* — Wade IP Law PLLC

(57) ABSTRACT

Techniques are described herein that are capable of configuring a device to have certificate(s) by ordering asynchronous work requests. Portions of work that are to be performed to configure a device to have certificate(s) are performed based at least in part on a triggering event that indicates that the device is to be configured. Asynchronous work requests that are configured to, when executed, initiate performance of the respective portions of the work are generated. A hierarchical work tree that includes hierarchical nodes that represent the respective portions of the work is generated. The hierarchical work tree defines an order in which the portions of the work are to be performed. The asynchronous work requests are executed in the order defined by the hierarchical work tree, which initiates creation of the certificate(s) and delivery of the certificate(s) to the device.

20 Claims, 7 Drawing Sheets

(51) Int. Cl.
*H04W 12/37* (2021.01)
*H04W 12/069* (2021.01)

(52) U.S. Cl.
CPC ....... *H04L 63/0823* (2013.01); *H04W 12/069* (2021.01); *H04W 12/37* (2021.01)

(56) References Cited

U.S. PATENT DOCUMENTS

| | | | |
|---|---|---|---|
| 8,332,629 B2* | 12/2012 | Rowley | G06Q 10/06 713/156 |
| 8,966,260 B1 | 2/2015 | Walter et al. | |
| 10,984,011 B1* | 4/2021 | Bishop | G06F 9/4881 |
| 2002/0083299 A1* | 6/2002 | Van Huben | G06F 15/17381 712/29 |
| 2002/0138577 A1* | 9/2002 | Teng | G06Q 10/10 709/205 |
| 2002/0166049 A1* | 11/2002 | Sinn | H04L 67/306 713/175 |
| 2002/0174238 A1* | 11/2002 | Sinn | G06Q 10/06 709/229 |
| 2003/0140223 A1 | 7/2003 | Desideri | |

* cited by examiner

CONFIGURING A DEVICE TO HAVE CERTIFICATE(S) BY ORDERING ASYNCHRONOUS WORK REQUESTS

CROSS-REFERENCE TO RELATED APPLICATION(S)

This application claims the benefit of U.S. Provisional Application No. 63/025,972, filed May 15, 2020 and entitled "Configuring a Device to Have Certificate(s) by Ordering Asynchronous Work Requests," the entirety of which is incorporated herein by reference.

BACKGROUND

Mobile Device Management (MDM) often is used to facilitate management of end user devices by an information technology (IT) administrator. For instance, MDM may enable the IT administrator to configure email, Virtual Private Network (VPN), WiFi, and certificate policies on the end user devices. End users who are associated with the end user devices may enroll the end user devices with a cloud-based management solution that includes the MDM functionality. Examples of a cloud-based management solution include but are not limited to Microsoft Intune®, which is developed and distributed by Microsoft Corporation; AirWatch®, which is developed and distributed by VMware Inc.; Unified Endpoint Management™, which is developed and distributed by MobileIron, Inc.; and Tanium Core Platform™, which is developed and distributed by Tanium Inc. Enrolling the end user devices with the cloud-based management solution may enable the solution to manage the end user devices. For instance, the IT administrator can use the solution to push an organization's configurations to the end user devices, enabling the end users to setup their email, VPN, and WiFi and to obtain certificates.

However, conventional cloud-based management solutions have their limitations, including but not limited to relatively low scalability, security, IT administrator experience, end user experience, and developer experience. For instance, conventional cloud-based management solutions often are spread across multiple services, which may lead to (a) increased latency of completing end-to-end delivery, (b) decreased reliability (e.g., if even a single service encounters an issue) of certificate delivery, self-service or error reporting to the IT administrator, and troubleshooting, and (c) increased likelihood that adding new features will regress other core functionality or degrade its performance. The conventional solutions may utilize iterative brute force techniques to configure a device to have a certificate, which often result in redundant work being performed, more computational resources being consumed, and no visibility into why performance of the work is failing. The conventional solutions may utilize heuristics to determine when a certificate is to be renewed, which may result in end users losing access to resources due to delays in renewal or failure to renew caused by reliance on the heuristics. The conventional solutions may not reliably revoke certificates or even retain information regarding the certificates. Accordingly, the IT administrator may not be able to control the lifecycle of certificates for lost devices or devices of employees who have left the organization.

SUMMARY

Various approaches are described herein for, among other things, configuring a device to have certificate(s) by ordering asynchronous work requests. A certificate is electronic information (e.g., code or data, such as a document) that proves ownership of a public key (e.g., an asymmetric public key). Accordingly, the certificate may cryptographically link ownership of the public key with an entity that owns the public key (i.e., the owner of the public key). For instance, the certificate may include the public key, information about the public key, information about an identity of the owner of the public key, information about the certificate, and a signature (a.k.a. signature of the public key) that is created by an issuer of the certificate. The certificate may be used for encryption of information associated with the owner of the public key, signing such information, and authentication of the owner of the public key. The certificate may be configured to have a format that is defined by the X.509 standard, which is defined by the International Telecommunications Union's Standardization sector (ITU-T). A certificate that is configured to have a format defined by the X.509 standard is referred to herein as an "X.509 certificate." X.509 certificates are used in a variety of Internet protocols, including Transport Layer Security (TLS) and its predecessor Secure Sockets Layer (SSL), both of which are commonly used to encrypt Hypertext Transfer Protocol Secure (HTTPS) communications.

In an example approach, portions of work that are to be performed to configure a device to have certificate(s) are performed based at least in part on a triggering event that indicates that the device is to be configured. Asynchronous work requests that are configured to, when executed, initiate performance of the respective portions of the work are generated. A hierarchical work tree that includes hierarchical nodes that represent the respective portions of the work is generated. The hierarchical work tree defines an order in which the portions of the work are to be performed based at least in part on rules that indicate conditions under which the portions of the work are to be performed. The asynchronous work requests are executed in the order defined by the hierarchical work tree, which initiates creation of the certificate(s) and delivery of the certificate(s) to the device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
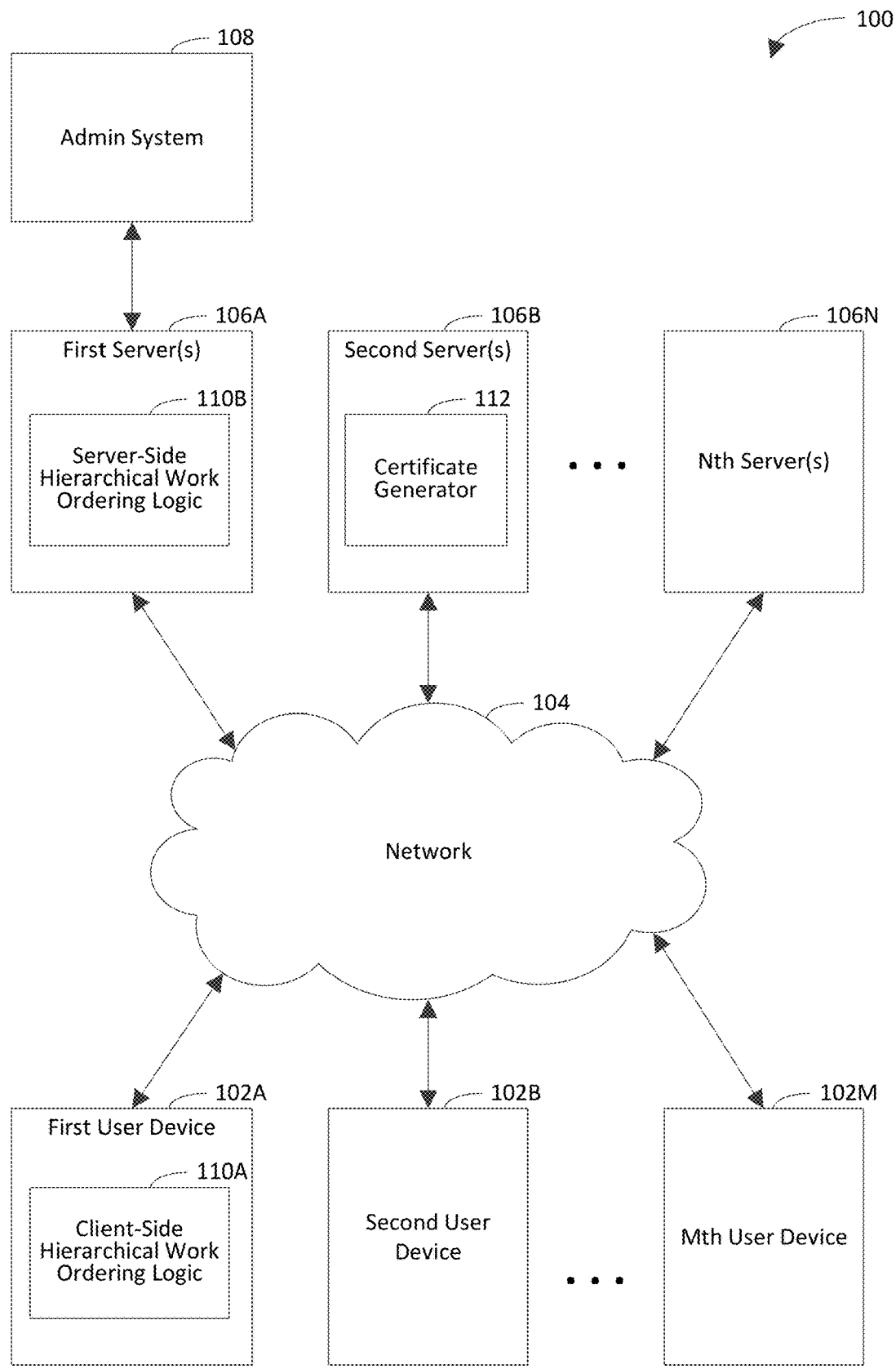
FIG. 1 is a block diagram of an example hierarchical work ordering system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of configuring a device to have certificate(s) by ordering asynchronous work requests. A certificate is electronic information (e.g., code or data, such as a document) that proves ownership of a public key (e.g., an asymmetric public key). Accordingly, the certificate may cryptographically link ownership of the public key with an entity that owns the public key (i.e., the owner of the public key). For instance, the certificate may include the public key, information about the public key, information about an identity of the owner of the public key, information about the certificate, and a signature (a.k.a. signature of the public key) that is created by an issuer of the certificate. The certificate may be used for encryption of information associated with the owner of the public key, signing such information, and authentication of the owner of the public key. The certificate may be configured to have a format that is defined by the X.509 standard, which is defined by the International Telecommunications Union's Standardization sector (ITU-T). A certificate that is configured to have a format defined by the X.509 standard is referred to herein as an "X.509 certificate." X.509 certificates are used in a variety of Internet protocols, including Transport Layer Security (TLS) and its predecessor Secure Sockets Layer (SSL), both of which are commonly used to encrypt Hypertext Transfer Protocol Secure (HTTPS) communications.

An asynchronous work request may be implemented as a software object and/or class, though the example embodiments are not limited in this respect. The asynchronous work requests described herein may sufficiently represent the information needed to track the lifecycle(s) of the certificate(s), including but not limited to information needed to issue the certificate(s), properties to set in the certificate(s), the type(s) of the certificate(s), and information indicating (e.g., describing) how to obtain the certificate(s).

Example techniques described herein have a variety of benefits as compared to conventional techniques for configuring a device to have certificate(s). For instance, the example techniques may be capable of guaranteeing delivery of the certificate(s) to the device and managing (e.g., tracking) the certificate(s) after their delivery. Accordingly, the example techniques may increase security of the device. The example techniques may centralize and streamline processing of certificate delivery by defragmenting the processing and storage of data into a single Certificate Management Service (CMS). The example techniques may reduce a likelihood of redundant work being performed (e.g., while performing operations to configure the device to have the certificate(s)). Processing of the certificate(s) may be tracked using a request model, such that each asynchronous work request is agnostic to the type of certificate being issued. The asynchronous work requests may be used by an IT administrator to track the lifetimes of the certificate(s) that are issued and to reliably revoke the certificate(s) as needed. Accordingly, the IT administrator may be able to control the lifecycle of certificate(s) for lost devices or devices of employees who have left the organization.

The example techniques may use information that is gathered from tracking the processing of the certificate(s) to deterministically (e.g., automatically) renew the certificate(s) before expiration of the certificate(s). Accordingly, the example techniques may enable (e.g., guarantee) timely renewal of the certificate(s). The asynchronous work requests may represent processing state and may be used to avoid unnecessary (e.g., redundant) issuance of certificates. A state machine based on states represented by the asynchronous work requests may be leveraged to provide more accurate and more thorough reporting and auditing for IT administrators, while enhancing troubleshooting capabilities. Scalability of the example techniques may be greater than scalability of the conventional techniques based at least in part on the example techniques ordering the asynchronous work requests to configure the device.

The example techniques may be implemented in a single service of a cloud-based management solution, which may result in (a) decreased latency of completing end-to-end delivery of the certificate(s), (b) increased reliability of certificate delivery, self-service or error reporting to the IT administrator, and troubleshooting, and (c) decreased likelihood that adding new features will regress other core functionality or degrade its performance. By utilizing a common coherent model, the example techniques may reduce design complexity of various certificate scenarios, which may reduce development cost of the cloud-based management solution.

The example techniques may support complex linking of the asynchronous work requests, and rules that are used to determine an order in which the asynchronous work requests are to be executed may govern permissible actions or states. Linking and ordering of the asynchronous work requests may ensure that processing for a request that is dependent on completion data from another request does not start until the completion of the other request. The linking of the asynchronous work requests may provide a substantial advantage when coordinating several different types of requests, enforcing ordering, avoiding failure of an entire operation due to failure of a single request, and allowing retry on some or all request failures. The linking may enable asynchronous work requests that already have been processed to be salvaged and re-linked if a need arises to do so.

HTTP actions may perform the triggers for creation of the certificate(s), state transition, completion, and deletion of the asynchronous work requests. These actions can originate from multiple sources, adding to the versatility of the example techniques and enabling the example techniques to be platform agnostic. The example techniques may reduce processing during device check-in. By using an asynchronous model, the device can defer long running operations, such as certificate requests to a certificate delivery service (CDS) (a.k.a. a certificate generator) and a certificate management system (CMS). The CDS and the CMS may perform the operation and may notify the device to check-in when the processing is completed. Even small savings in processing time may allow million(s) more devices to use existing scale units, saving operational costs for the cloud-based management system. The example techniques may be capable of deterministically tracking (e.g., managing) the lifetime of all asynchronous work requests and their resulting certificates, which may result in a better (e.g., more thorough, accurate, and precise) reporting experience to the IT administrator.

The example techniques may enable some of the processing logic for configuring the device to be moved from a customer's on-premise components to server-side components of the cloud-based management system. Such components may be bundled as on-premise connector installers. Moving the processing logic to the server-side components may improve telemetry, ease and speed of development and bug fixes, simplify deployments for customers, and provide increased performance even if the customer is using less than optimal hardware.

A centralized platform agnostic approach provides a framework to support the ever-changing landscape in MDM. The example techniques may mitigate (e.g., eliminate) recurring development costs to support new channels. The example techniques may be capable of notifying end-users to perform requisite manual interactions for completing a certificate delivery flow and to inform other services to resume processing or notify devices to check-in. The example techniques may increase resilience of the certificate delivery flow and reduce notification noise by mapping multiple triggers to a single notification action and retrying if notifications fail.

The example techniques may reduce an amount of time and/or resources (e.g., processor cycles, memory, network bandwidth) that is consumed to configure a device to have certificate(s). The example techniques may reduce a cost associated with configuring the device to have the certificate(s). For instance, by ordering the asynchronous work requests to configure the device, the amount of redundant work that is performed to configure the device may be reduced. Reducing the amount of redundant work may reduce the time, cost, and/or resource consumption associated with configuring the device to have the certificate(s). The example techniques may increase efficiency of a computing system that is used to configure the device to have the certificate(s).

The example techniques may increase efficiency of an IT administrator and/or an end user. For example, by ordering the asynchronous work requests to configure the device, the example techniques may reduce a number of steps that are performed by the IT administrator and/or the end user, an amount of effort that the IT administrator and/or the end user expends, and/or an amount of time that the IT administrator and/or the end user takes to facilitate the configuration of the device. The example techniques may improve a user experience of and end user, the IT administrator, and/or a developer of the cloud-based management solution (e.g., by streamlining the solution).

FIG. 1 is a block diagram of an example hierarchical work ordering system 100 in accordance with an embodiment. Generally speaking, hierarchical work ordering system 100 operates to provide information to users in response to (e.g., based on) requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, hierarchical work ordering system 100 configures a device to have certificate(s) by ordering asynchronous work requests.

As shown in FIG. 1, hierarchical work ordering system 100 includes a plurality of user devices 102A-102M, a network 104, a plurality of servers 106A-106N, and an admin system 108. Communication among user devices 102A-102M, servers 106A-106N, and admin system 108 is carried out over network 104 using well-known network communication protocols. Network 104 may be a wide-area network (e.g., the Internet), a local area network (LAN), another type of network, or a combination thereof.

User devices 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User devices 102A-102M are configured to provide requests to servers 106A-106N for requesting information stored on (or otherwise accessible via) servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, user devices 102A-102M are capable of accessing domains (e.g., Web sites) hosted by servers 106A-106N, so that user devices 102A-102M may access information that is available via the domains. Such domains may include Web pages, which may be provided as hypertext markup language (HTML) documents and objects (e.g., files) that are linked therein, for example.

Each of user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more user devices 102A-102M may communicate with any one or more servers 106A-106N.

First user device 102A is shown to include client-side hierarchical work ordering logic 110A for illustrative purposes. Client-side hierarchical work ordering logic 110A is configured to perform client-side aspects of the example techniques described herein. For instance, client-side hierarchical work ordering logic 110A may perform a triggering event that indicates that first user device 102A is to be configured. The triggering event may trigger asynchronous work requests to be generated for configuring the first user device 102A. For instance, by performing the triggering event, client-side hierarchical work ordering logic 110A may cause server-side hierarchical work ordering logic 110B, which is discussed in further detail below, to generate the asynchronous work requests. Client-side hierarchical work ordering logic 110A may perform other operations (e.g., support operations) to help server-side hierarchical work ordering logic 110B configure first user device 102A to have the certificate(s).

Servers 106A-106N are processing systems that are capable of communicating with user devices 102A-102M. Servers 106A-106N are configured to execute computer programs that provide information to user devices 102A-102M. For instance, servers 106A-106N may push such information to user devices 102A-102M or provide the information in response to requests that are received from user devices 102A-102M. The requests may be user-generated or generated without user involvement. For example, policies that are applied to a user device are done without explicit user requests. In accordance with this example, the policies are applied in the background even if no user is logged onto the user device. In further accordance with this example, the user device (e.g., an agent thereon, such as client-side hierarchical work ordering logic 110A) may poll a server for policy on a schedule (e.g., once per hour) or on events (e.g., device wakeup, user unlock, etc.). In further accordance with this example, the server may push the policy to the user device (e.g., an agent thereon) via an open HTTP endpoint. The information provided by servers 106A-106N may include documents (e.g., Web pages, images, audio files, video files, etc.), output of executables, or any other suitable type of information. In accordance with some example embodiments, servers 106A-106N are configured to host respective Web sites, so that the Web sites are accessible to users of hierarchical work ordering system 100.

First server(s) 106A is shown to include server-side hierarchical work ordering logic 110B for illustrative purposes. Server-side hierarchical work ordering logic 110B is configured to perform server-side aspects of the example techniques described herein. For example, server-side hierarchical work ordering logic 110B may determine portions of work that are to be performed to configure first user device 102A to have the certificate(s) based at least in part on detection of the triggering event that is performed by first user device 102A. Server-side hierarchical work ordering logic 110B may generate asynchronous work requests that are configured to, when executed, initiate performance of the respective portions of the work. Server-side hierarchical work ordering logic 110B may generate a hierarchical work tree that includes hierarchical nodes that represent the respective portions of the work. The hierarchical work tree defines an order in which the portions of the work are to be performed based at least in part on rules that indicate conditions under which the portions of the work are to be performed. For instance, the rules may define a state machine that determines allowed states of the asynchronous work requests and valid transitions between states. A state at which a transition begins (e.g., originates) is referred to as an "origination state." A state at which a transition ends is referred to as a "destination state." Each transition from an origination state to a destination state represents one or more actions that are to be performed to transition from the origination state to the destination state. Server-side hierarchical work ordering logic 110B may execute the asynchronous work requests in the order defined by the hierarchical work tree, which initiates creation of the certificate(s) and delivery of the certificate(s) to first user device 102A. For instance, execution of the asynchronous work requests may include sending a request to a certificate generator 112, which is discussed in further detail below, requesting generation (e.g., creation) of the certificate(s). Server-side hierarchical work ordering logic 110B may be capable of driving state changes from actions and generating notifications that can trigger additional actions. Server-side hierarchical work ordering logic 110B may determine a history of certificate states based on the states of the asynchronous work requests Server-side hierarchical work ordering logic 110B may monitor operations that are performed to configure first user device 102A and flow of the certificate(s) to identify service errors, bugs, and customer environment issues. The certificate states may be used by the IT administrator for auditing the certificate(s) (e.g., to determine a revocation of a certificate on a lost device to block access to corporate resources).

Second server(s) 106B is shown to include certificate generator 112 for illustrative purposes. Certificate generator 112 is configured to generate certificates in response to requests to generate the certificates. For instance, certificate generator 112 may generate the certificate(s) that are to be provided to first user device 102A in response to receipt of the request that is sent by server-side hierarchical work ordering logic 110B, as described above. Certificate generator 112 may deliver each of the certificate(s) to client-side hierarchical work ordering logic 110A in response to generating the respective certificate.

Admin system 108 is a processing system that is capable of communicating with servers 106A-106N. Admin system 108 is configured to perform operations to facilitate configuration of user devices 102A-102M in response to instructions that are received from the IT administrator of hierarchical work ordering system 100. For instance, admin system 108 may provide commands to first server(s) 106A, indicating which policies (a.k.a. profiles) are to be downloaded to user devices 102A-102M, based on instructions that are received form the IT administrator that specify those policies. Examples of a policy include a WiFi policy, a VPN policy, an email policy, and a certificate policy. A WiFi policy specifies configuration settings that a user device is configured to utilize to access a WiFi network. A VPN policy specifies a configuration of a VPN. An email policy specifies a configuration of an email program. A certificate policy specifies certificate(s) that are to be utilized by a user device (e.g., for authentication, signing, and/or encryption). For instance, the certificate policy may specify which of the certificate(s) are to be used for accessing each of the WiFi network, the VPN, and the email program and/or for performing operations therein. For example, the certificate policy may specify that a first certificate is to be used for signing emails and that a second certificate is to be used for encrypting the emails.

Each of client-side hierarchical work ordering logic 110A, server-side hierarchical work ordering logic 110B, and certificate generator 112 may be implemented in various ways to configure a device (e.g., any of user devices 102A-102M) to have certificate(s) by ordering asynchronous work requests, including being implemented in hardware, software, firmware, or any combination thereof. For example, each of client-side hierarchical work ordering logic 110A, server-side hierarchical work ordering logic 110B, and certificate generator 112 may be implemented as computer program code configured to be executed in one or more processors. In another example, each of client-side hierarchical work ordering logic 110A, server-side hierarchical work ordering logic 110B, and certificate generator 112 may be at least partially implemented as hardware logic/electrical circuitry. For instance, each of client-side hierarchical work ordering logic 110A, server-side hierarchical work ordering logic 110B, and certificate generator 112 may be at least partially implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Client-side hierarchical work ordering logic 110A is shown to be incorporated in first user device 102A for illustrative purposes and is not intended to be limiting. It will be recognized that client-side hierarchical work ordering logic 110A may be incorporated in any of the user devices 102A-102M. Server-side hierarchical work ordering logic 110B is shown to be incorporated in first server(s) 106A for illustrative purposes and is not intended to be limiting. It will be recognized that server-side hierarchical work ordering logic 110B may be incorporated in any one or more of the servers 106A-106N. Certificate generator 112 is shown to be incorporated in second server(s) 106B for illustrative purposes and is not intended to be limiting. It will be recognized that certificate generator 112 may be incorporated in any one or more of the servers 106A-106N.

Figure 2:
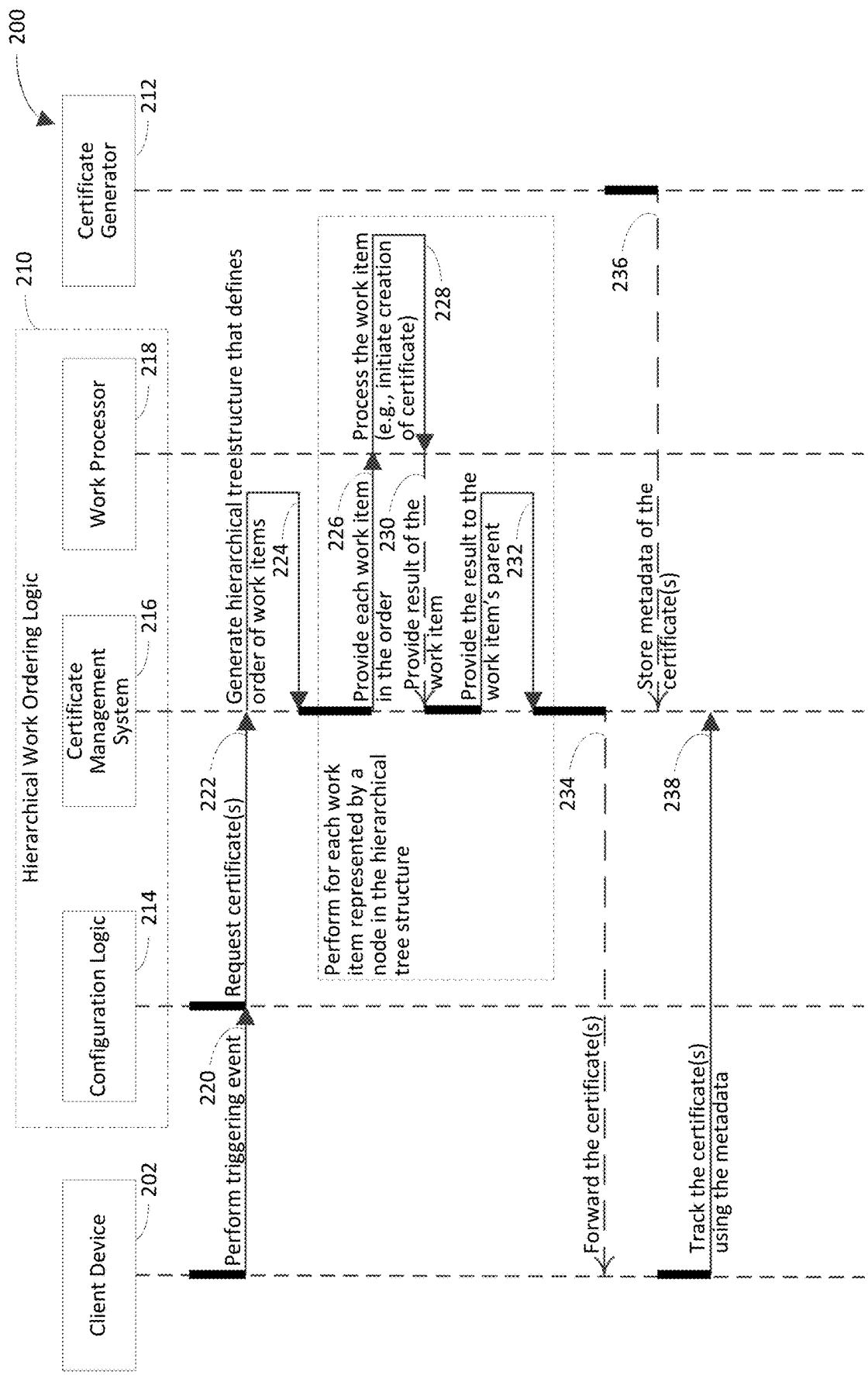
FIG. 2 is an example activity diagram for configuring a device to have certificate(s) by ordering asynchronous work requests in accordance with an embodiment.

FIG. 2 is an example activity diagram 200 for configuring a device to have certificate(s) by ordering asynchronous work requests in accordance with an embodiment. FIG. 2 depicts a client device 202, hierarchical work ordering logic 210, and a certificate generator 212, which are example implementations of a client device 102, hierarchical work ordering logic 110, and certificate generator 112, respectively, shown in FIG. 1. Hierarchical work ordering logic 210 includes configuration logic 214, a certificate management system (CMS) 216, and a work processor 218. Activities 220, 222, 224, 226, 228, 230, 232, 234, 236, and 238 will now be described with reference to client device 202, configuration logic 214, certificate management system 216, work processor 218, and certificate generator 212.

In activity 220, client device 202 performs a triggering event. The triggering event indicates that client device 202 is to be configured. For instance, the triggering event may include client device 202 turning on, booting or re-booting, installing new software or hardware, or logging into a cloud-based management system. Configuration of client device 202 may include setting parameters of software (e.g., email, VPN, or WiFi software) that is to run on client device 202.

In activity 222, configuration logic 214 requests certificate(s) that are to be provided to client device 202 to facilitate the configuration of client device 202. For example, configuration logic 214 may request the certificate(s) based on (e.g., based at least in part on) performance of the triggering event. In accordance with this example, the triggering event may trigger configuration logic 214 to request the certificate(s).

In activity 224, CMS 216 generates a hierarchical tree structure that defines an order of work items (a.k.a. portions of work) that are to be performed to configure client device 202. For instance, CMS 216 may determine the work items and generate the hierarchical tree structure based on the determination of which work items are to be performed. The hierarchical tree structure includes nodes that represent the respective work items. The nodes are hierarchically arranged in the hierarchical tree structure to reflect the order in which the work items are to be performed. For example, the hierarchical tree structure may include subsets of the nodes in respective hierarchical levels of the hierarchical tree structure. In accordance with this example, a first (i.e., highest) level of the of the hierarchical tree structure may include a first subset of the nodes; a second level of the hierarchical tree structure, which is located directly beneath the first level, may include a second subset of the nodes; a third level of the hierarchical tree structure, which is located directly beneath the second level, may include a third subset of the nodes, and so on. The first subset includes a root node of the hierarchical tree structure. Each other subset includes one or more of the nodes. A rule may be established to require that the work items represented by the nodes in each given hierarchical level of the hierarchical tree structure are to be performed before the work items represented by the nodes in the next higher hierarchical level that have a dependency on the nodes in the given hierarchical level. An example of ordering work items is described in greater detail below with regard to FIG. 3.

In activity 226, CMS 226 provides each work item to work processor 218 in the order that is defined by the hierarchical tree structure.

In activity 228, work processor 218 processes the respective work item. Processing the respective work item may include setting parameters of software and/or hardware, storing information, and/or instructing other entities (e.g., certificate generator 212) to perform operations. For example, processing the respective work item may include initiating creation of a certificate. In accordance with this example, work processor 218 may provide a request to certificate generator 212, requesting creation of the certificate. In further accordance with this example, certificate generator 212 may generate the certificate based on receipt of the request from work processor 218. It will be recognized that creation of the certificate(s) that are requested in activity 222 is initiated by processing respective work item(s) in activity 228.

In an example embodiment, the work items are associated with respective asynchronous work requests. In accordance with this embodiment, processing the respective work items in activity 228 includes executing the respective asynchronous work requests. For instance, executing the asynchronous work requests may initiate processing of the respective work items.

In activity 230, work processor 218 provides a result of processing the respective work item to CMS 216. The result may include information regarding parameters that have been set, information that has been stored, and/or operations that other entities have been instructed to perform (e.g., the results of such operations). The result of processing the respective work item may indicate a state of one or more of the certificate(s). For instance, the result may indicate whether one or more of the certificate(s) have been created.

In activity 232, CMS 216 provides the result to a parent work item of the respective work item (i.e., a work item that has a dependency on the respective work item). It will be recognized that multiple work items may have a dependency on the respective work item. CMS 216 may provide the result to each of the work items that has a dependency on the respective work item.

Activities 226, 228, 230, and 232 are performed for each work item represented by a node in the hierarchical tree structure. Accordingly, activities 226, 228, 230, and 232 may be performed iteratively, with these activities being performed for each work item in a respective iteration. For instance, activities 226, 228, 230, and 232 may be performed for a first work item represented by a first node in the hierarchical tree structure during a first iteration; activities 226, 228, 230, and 232 may be performed for a second work item represented by a second node in the hierarchical tree structure during a second iteration, and so on. Any two or more of the iterations may be performed simultaneously, so long as each work item (or subset of the work items) that has a dependency on another work item (or subset of the work items) is not processed until the other work item (or subset) is processed. Any two or more of the iterations may performed consecutively.

In activity 234, CMS 216 forwards the certificate(s) to client device 202 to facilitate configuration of client device 202. For instance, CMS 216 may provide each of the certificate(s) to CMS 216 in response to work processor 218 initiating creation of the respective certificate in activity 228. Certificate generator 212 may provide the certificate(s) to CMS 216 one-at-a-time when the certificate(s) are created, or certificate generator 212 may provide two or more (e.g., all) certificates to CMS 216 at the same time (i.e., after the two or more certificates have been created). CMS 216 may forward the certificate(s) to client device 202 one-at-a-time when the certificate(s) are received from certificate generator 212, or CMS 216 may forward any two or more (e.g., all) certificates to client device 202 at the same time (i.e., after the two or more certificates are received from certificate generator 212.

In an example embodiment, CMS 216 does not receive the certificate(s) from certificate generator 212, and CMS 216 therefore does not forward the certificate(s) to client device 202 in activity 234. In accordance with this embodiment, certificate generator 212 provides the certificate(s) to client device 202 without passing the certificate(s) through CMS 216. Accordingly, certificate generator 212 may provide the certificate(s) directly to client device 202.

In activity 236, metadata of the certificate(s) is stored by CMS 216. For instance, certificate generator 212 may provide the metadata to CMS 216 for storage. The metadata may include a work item identifier that identifies each work item (or asynchronous work request associated therewith), a timestamp that indicates (e.g., specifies) a time at which the work item was processed, the result of the work item (e.g., creation of a certificate, setting of parameter(s), and/or storage of information), and an endpoint identifier that identifies a name and/or uniform resource identifier (URI) of a certificate generator that creates each certificate. For example, each URI may be a uniform resource name (URN) or a uniform resource locator (URL). The metadata of each certificate may uniquely identify the respective certificate. For instance, the metadata of each certificate may include a certificate thumbprint that is specific to the respective certificate. Accordingly, the metadata of each certificate may distinguish the respective certificate from other certificates. Certificate generator 212 may perform activity 236 each time a circumstance (e.g., state) of a certificate changes.

In activity 238, CMS 216 tracks the certificate(s) using the metadata. For instance, CMS 216 may monitor a state of each certificate, which is indicated by the metadata, to determine whether additional work items are to be processed with regard to the respective certificate. For example, a state of a certificate changing from a first state to a second state may indicate that work processor 218 is to process specified work items. If CMS 216 determines that additional work items are to be processed, CMS 216 may provide a work instruction to work processor 218, instructing work processor 218 to process the additional work items. For instance, the additional work items may be configured to generate a WiFi profile indicating configuration settings that are to be applied to client device 202 to enable client device 202 to access a WiFi network; a VPN profile indicating a configuration of a VPN, including, for example, an identification of a certificate that is to be used by client device 202 to authenticate a user of client device 202 to the VPN; an email profile indicating a configuration of an email program that is to be used by client device 202, including, for example, an identification of a certificate that is to be used by client device 202 to authenticate the user of client device 202 to the email program; and/or a certificate profile indicating one or more certificate(s) that are to be used by client device 202 to authenticate the user of client device 202 to an entity (e.g., a software program installed on client device 202 or a cloud service), sign information, and/or encrypt information. CMS 216 may provide the WiFi profile, the VPN profile, the email profile, and/or the certificate profile to client device 202 to further facilitate configuration of client device 202.

Figure 3:
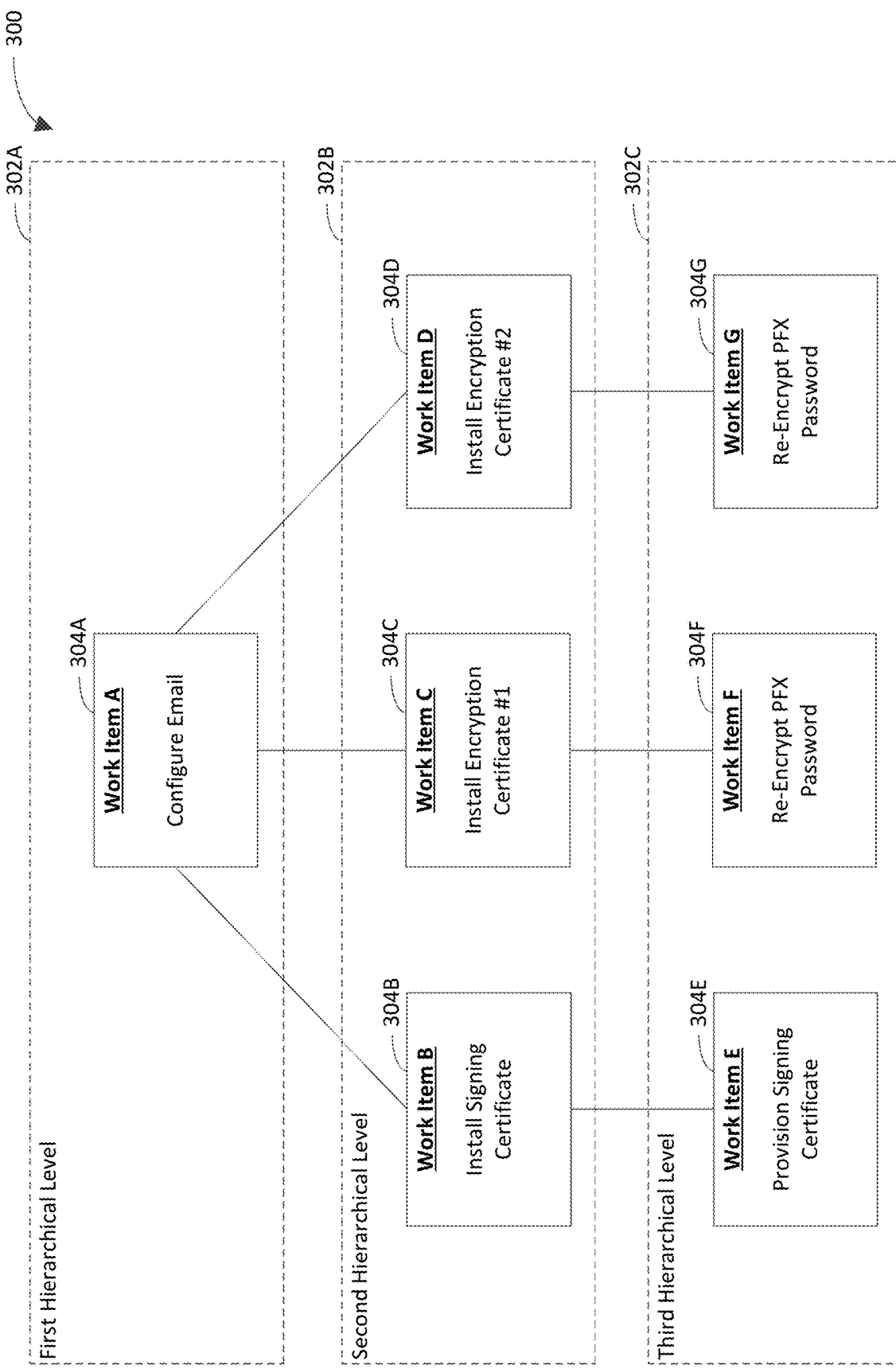
FIG. 3 is a block diagram of an example hierarchical work tree in accordance with an embodiment.

FIG. 3 is a block diagram of an example hierarchical work tree 300 in accordance with an embodiment. As shown in FIG. 3, hierarchical work tree 300 includes hierarchical nodes 304A-304G, which represent respective work items A-G. Work item A is configured to configure an email account on a device of a user. Work item B is configured to cause a signing certificate to be installed on the device. For instance, processing work item B may install the signing certificate on the device or instruct another entity (e.g., certificate generator 112 or 212) to install the signing certificate on the device. Work item C is configured to cause encryption certificate #1 to be installed on the device. Work item D is configured to cause encryption certificate #2 to be installed on the device. Work item E is configured to cause the signing certificate to be provisioned on the device. Work item F is configured to re-encrypt a PFX password associated with encryption certificate #1. Work item G is configured to re-encrypt a PFX password associated with encryption certificate #2. PFX is an archive file format that is used to store multiple cryptographic objects in a single file. A PFX password is a password that that is capable of being used to bundle a certificate and a private key that is associated with the certificate in accordance with the PFX file format. For example, the PFX password may be used to encrypt a file that includes the certificate and that further includes the private key. PKCS #12 is another archive file format that is used to store multiple cryptographic objects in a single file. PKCS #12 is the successor of PFX. It will be recognized that a PKCS #12 password may be used in lieu of the PFX password to bundle a certificate and a private key associated with the certificate.

Hierarchical work tree 300 includes a first hierarchical level 302A, a second hierarchical level 302B, and a third hierarchical level 302C. First hierarchical level 302A includes node 304A, which represents work item A. Second hierarchical level 302B includes nodes 304B-304D, which represent respective work items B-D. Third hierarchical level 302C includes nodes 304E-304G, which represent respective work items E-G. Work item A has a dependency on each of work items B-D. Work item B has a dependency on work item E. Work item C has a dependency on work item F. Work item D has a dependency on work item G.

Rules may indicate conditions under which the work items A-G are to be performed. For purposes of illustration, assume that a rule specifies that if a given work item has a dependency on another work item, the other work item must be processed (e.g., completed), before the given work item is processed. Applying this rule, we see that work item E must be processed before work item B because work item B has a dependency on work item E. Thus, the signing certificate is provisioned before the signing certificate is installed. Work item B must be processed before work item A because work item A has a dependency on work item B. Thus, the signing certificate is installed before the email is configured. Work item F must be processed before work item C because work item C has a dependency on work item F. Thus, the PFX password associated with encryption certificate #1 is re-encrypted before encryption certificate #1 is installed. Work item C must be processed before work item A because work item A has a dependency on work item C. Thus, encryption certificate #1 is installed before the email is configured. Work item G must be processed before work item D because work item D has a dependency on work item G. Thus, the PFX password associated with encryption certificate #2 is re-encrypted before encryption certificate #2 is installed. Work item D must be processed before work item A because work item A has a dependency on work item D. Thus, encryption certificate #2 is installed before the email is configured.

Figure 4:
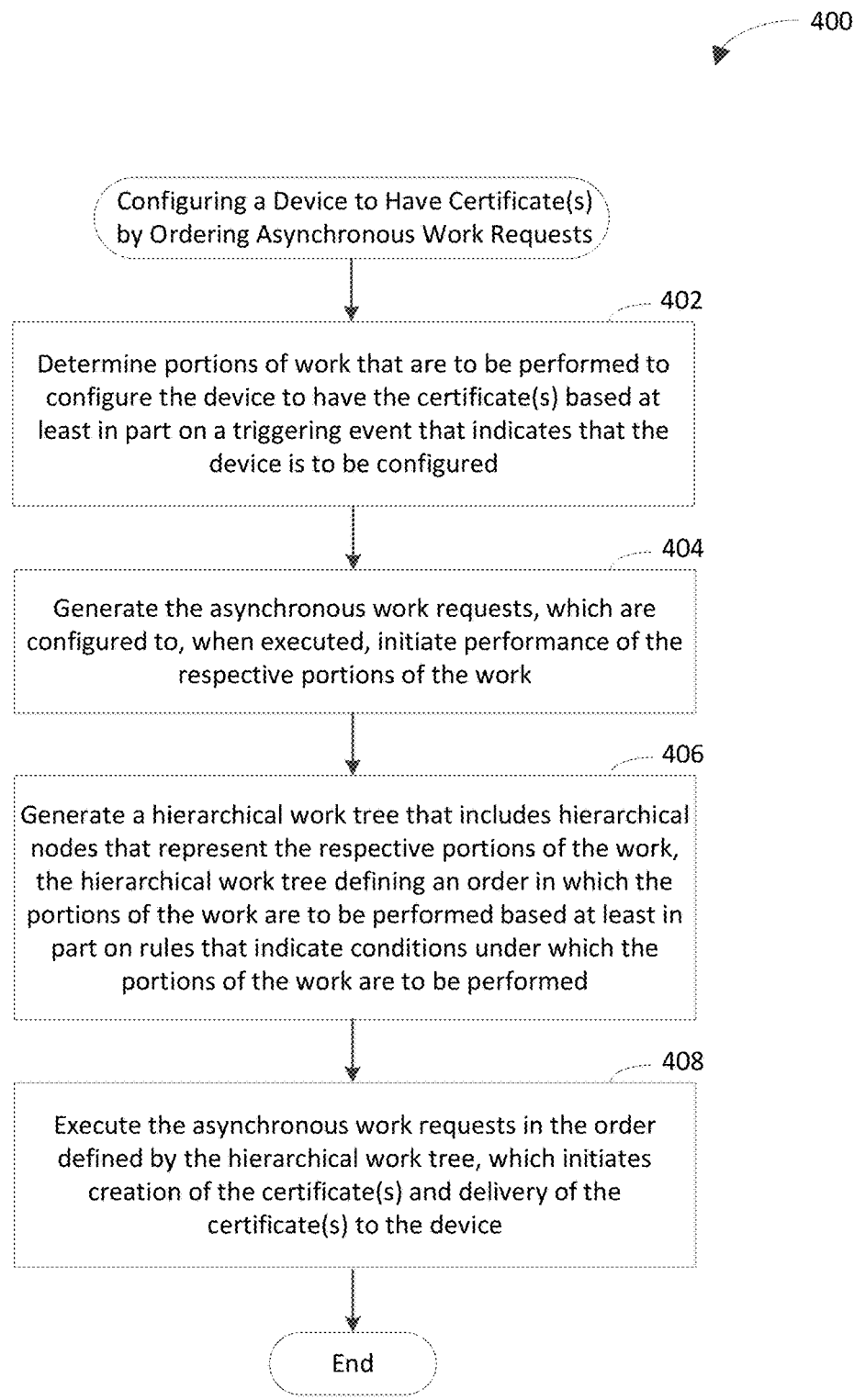
FIG. 4 depicts a flowchart of an example method for configuring a device to have certificate(s) by ordering asynchronous work requests in accordance with an embodiment.
Figure 5:
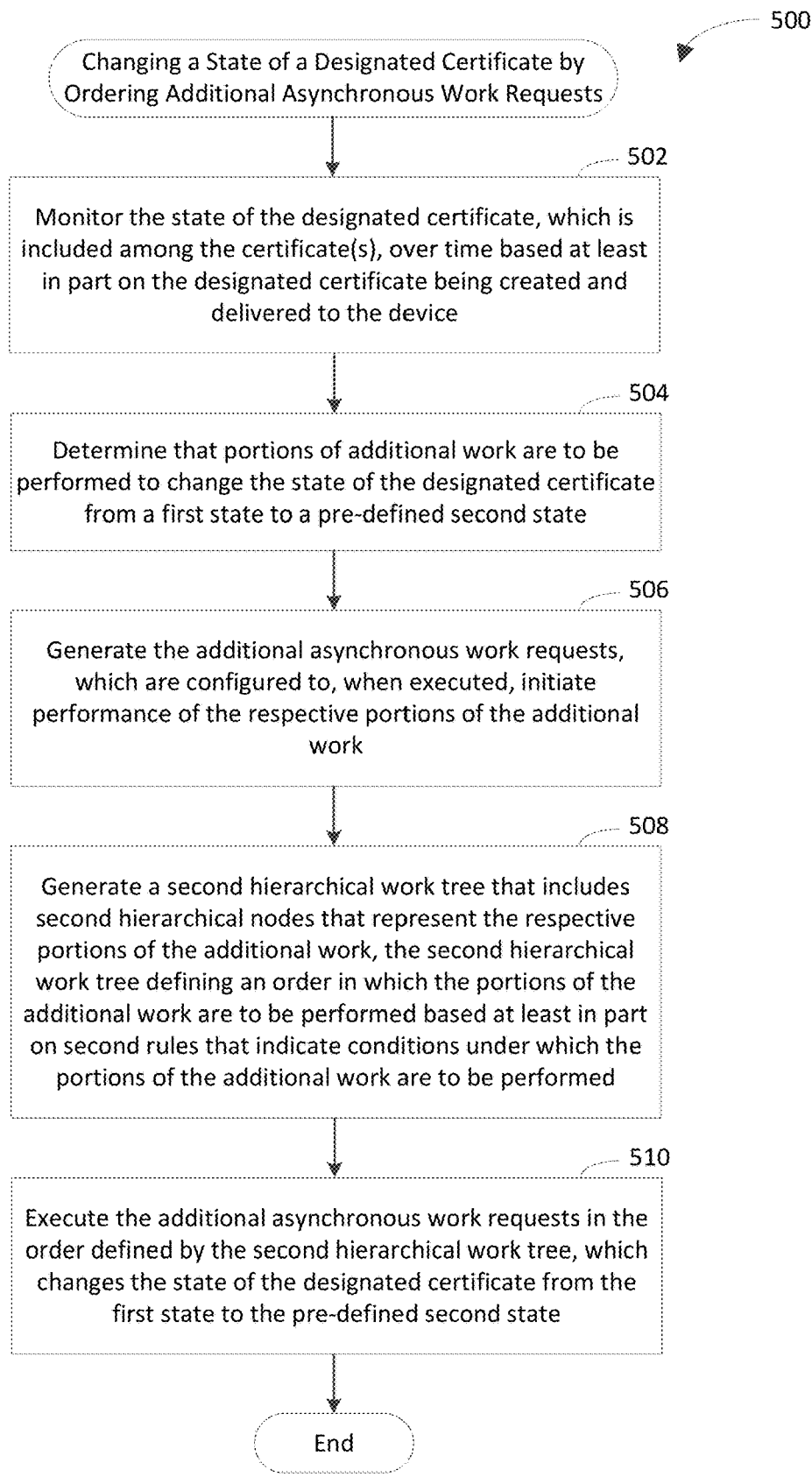
FIG. 5 depicts a flowchart of an example method for changing a state of a designated certificate by ordering additional asynchronous work requests in accordance with an embodiment.
Figure 6:
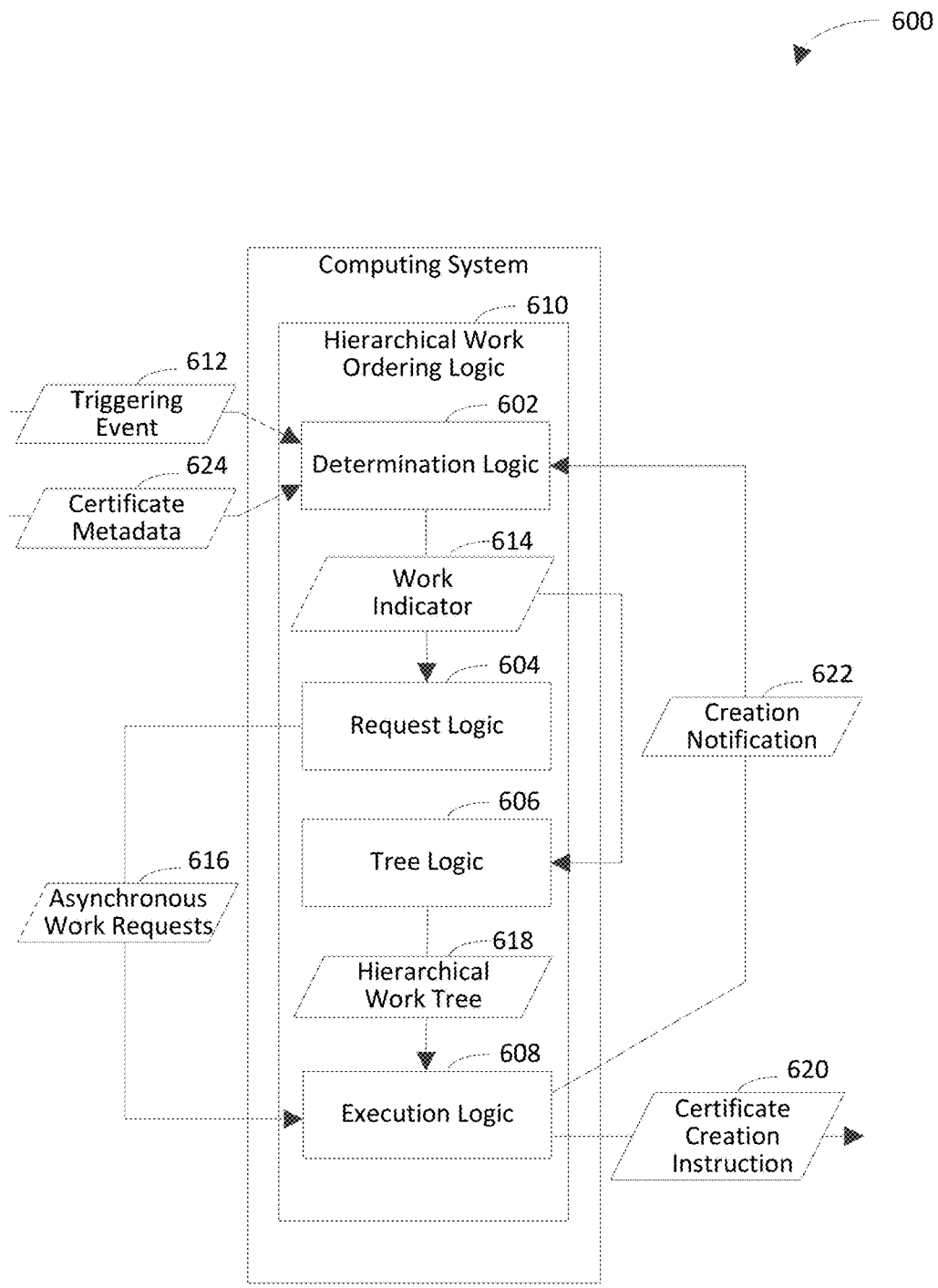
FIG. 6 is a block diagram of an example computing system in accordance with an embodiment.

FIG. 4 depicts a flowchart 400 of an example method for configuring a device to have certificate(s) by ordering asynchronous work requests in accordance with an embodiment. FIG. 5 depicts a flowchart 500 of an example method for changing a state of a designated certificate by ordering additional asynchronous work requests in accordance with an embodiment. Flowcharts 400 and 500 may be performed by client-side hierarchical work ordering logic 110A shown in FIG. 1, server-side hierarchical work ordering logic 110B shown in FIG. 1, or a combination thereof, for example. For illustrative purposes, flowcharts 400 and 500 are described with respect to a computing system 600 shown in FIG. 6. Computing system 600 includes hierarchical work ordering logic 610, which is an example implementation of client-side hierarchical work ordering logic 110A, server-side hierarchical work ordering logic 110B, or a combination thereof. Hierarchical work ordering logic 610 includes determination logic 602, request logic 604, tree logic 606, and execution logic 608. Further structural and operational embodiments will be apparent to persons skilled in the relevant art(s) based on the discussion regarding flowcharts 400 and 500.

As shown in FIG. 4, the method of flowchart 400 begins at step 402. In step 402, portions of work that are to be performed to configure the device to have the certificate(s) are determined based at least in part on a triggering event that indicates that the device is to be configured. In an example implementation, determination logic 602 determines the portions of the work that are to be performed to configure the device to have the certificate(s) based at least in part on a triggering event 612 that indicates that the device is to be configured. In accordance with this implementation, determination logic 602 may generate a work indicator 614, which indicates the portions of the work that are to be performed.

At step 404, the asynchronous work requests are determined. The asynchronous work requests are configured to, when executed, initiate performance of the respective portions of the work. The asynchronous work requests may be interrelated, meaning that the asynchronous work requests have a mutual or reciprocal relation (e.g., based on being configured to contribute to initiating creation of the one or more certificates). In an example implementation, request logic 604 determines asynchronous work requests 616, which are configured to, when executed, initiate the performance of the respective portions of the work. For instance, request logic 604 may generate the asynchronous work requests 616. In accordance with this implementation, request logic 604 may generate the asynchronous work requests 616 based at least in part on receipt of the work indicator 614 (e.g., based at least in part on the work indicator 614 indicating the portions of the work that are to be performed).

At step 406, a hierarchical work tree is generated. The hierarchical work tree includes hierarchical nodes that represent the respective portions of the work. The hierarchical work tree defines an order in which the portions of the work are to be performed based at least in part on rules that indicate conditions under which the portions of the work are to be performed. In an example implementation, tree logic 606 generates a hierarchical work tree 618 that includes the hierarchical nodes that represent the respective portions of the work. The hierarchical work tree 618 defines the order in which the portions of the work are to be performed. In accordance with this implementation, tree logic 606 may generate the hierarchical work tree 618 based at least in part on receipt of the work indicator 614 (e.g., based at least in part on the work indicator 614 indicating the portions of the work that are to be performed). For example, tree logic 606 may analyze the portions of the work that are indicated by the work indicator 614 to determine dependencies among the portions of the work. In accordance with this example, tree logic 606 may determine each portion of the work that has a dependency and the portion of the work on which that portion has the dependency. In further accordance with this example, tree logic 606 may determine the order in which the portions of the work are to be performed based at least in part on the dependencies that are determined by tree logic 606. For instance, the rules may indicate that each portion of the work that has a dependency on another portion of the work must not be performed until the other portion of the work is performed. Accordingly, tree logic 606 may apply the rule to the portions of the work based at least in part on knowledge of the dependencies to determine the order in which the portions of the work are to be performed. Tree logic 606 may arrange the nodes of the hierarchical work tree 618 to reflect the order.

At step 408, the asynchronous work requests are executed in the order defined by the hierarchical work tree, which initiates creation of the certificate(s) and delivery of the certificate(s) to the device. For example, executing the asynchronous work requests at step 408 may cause the one or more certificates to be created. In an example implementation, execution logic 608 executes the asynchronous work requests 616 in the order that is defined by the hierarchical work tree 618. For instance, execution of the asynchronous work requests 616 may include generating a certificate creation instruction 620, which instructs a certificate generator (e.g., certificate generator 112) to create the certificate(s). It will be recognized that execution logic 608 may generate a certificate creation instruction 620 for each certificate. Execution logic 608 may generate a creation notification 622 to notify determination logic 602 that creation of the certificate(s) has been initiated. It will be recognized that execution logic 608 may provide a creation notification 622 for each certificate, notifying determination logic 602 that creation of the respective certificate has been initiated (e.g., requested).

In an example embodiment, determining the portions of the work at step 402 includes determining subsets of the work that are to be performed to configure the device to have respective certificates based at least in part on the triggering event. In accordance with this embodiment, each subset of the work includes multiple portions of the work. In further accordance with this embodiment, the hierarchical work tree defines an order in which the subsets of the work are to be performed based at least in part on the rules that indicate conditions under which the subsets of the work are to be performed.

In accordance with this embodiment, determining the subsets of the work may include determining first and second subsets of the work that are to be performed to configure the device to have respective first and second certificates. In further accordance with this embodiment, the rules may indicate that performance of portions of the work that are included in the first subset is to be initiated after performance of portions of the work that are included in the second subset is completed based at least in part on the first subset being dependent on the second subset (e.g., based at least in part on at least one portion of the work in the first subset being dependent on at least on portion of the work in the second subset). If an attempt to performance of a subset of the work fails, a report may be generated to notify an IT administrator that the attempt failed and/or performance of the subset may be automatically attempted again (e.g., independently from the other subsets of the work).

In another example embodiment, determining the portions of the work at step 402 includes determining designated portions of the work that are to be performed to configure the device to have a designated certificate based at least in part on the triggering event. In accordance with this embodiment, generating the asynchronous work requests at step 404 includes generating designated asynchronous work requests that are configured to, when executed, initiate performance of the respective designated portions of the work. In further accordance with this embodiment, a specified asynchronous work request, which is included among the designated asynchronous work requests, is configured to, when executed, initiate notification of a user of the device that an action is to be performed by the user based at least in part on performance of the action being a pre-requisite to creation of the designated certificate. In further accordance with this embodiment, executing the asynchronous work requests in the order at step 408 includes discontinuing execution of the designated asynchronous work requests to await performance of the action and further includes resuming the execution of the designated asynchronous work requests based at least in part on the performance of the action. The execution of the designated asynchronous work requests initiates the creation of the designated certificate and delivery of the designated certificate to the device.

It should be noted that if the notification of the user cannot be initiated or if the performance of the action does not occur, an IT administrator may be notified of the same. For instance, execution logic 608 may notify the IT administrator. Notifications of the user may be tracked and orchestrated in a manner similar to the certificates as described herein. For example, determination logic 602 may track and orchestrate the notifications.

In some example embodiments, one or more steps 402, 404, 406, and/or 408 of flowchart 400 may not be performed. Moreover, steps in addition to or in lieu of steps 402, 404, 406, and/or 408 may be performed. For instance, in an example embodiment, the triggering event indicates that the device is to be configured to access a WiFi network. In accordance with this embodiment, the method of flowchart 400 further includes providing a WiFi profile to the device. For example, execution logic 608 may provide the WiFi profile to the device. The WiFi profile indicates (e.g., specifies) configuration settings that the device is configured to utilize to access the WiFi network. For instance, the WiFi profile may indicate a service set identifier (SSID) that the device is to utilize to access the WiFi network. In accordance with this embodiment, the configuration settings indicate that a certificate is to be used to authenticate the user to the WiFi network. In further accordance with this embodiment, the method of flowchart 400 further includes configuring the device to access the WiFi network by associating a specified certificate, which is included among the certificate(s), with the WiFi profile, which configures the device to use the specified certificate to authenticate the user to the WiFi network in accordance with the configuration settings. For example, execution logic 608 may configure the device to access the WiFi network.

In another example embodiment, the triggering event indicates that the device is to be configured to utilize a virtual private network (VPN) to access a private computer network. In accordance with this embodiment, the method of flowchart 400 further includes providing a VPN profile to the device. For example, execution logic 608 may provide the VPN profile to the device. The VPN profile specifies a configuration of the VPN. The configuration of the VPN indicates that a certificate is to be used to authenticate the user to the VPN. In further accordance with this embodiment, the method of flowchart 400 further includes configuring the device to utilize the VPN to access the private computer network by associating a specified certificate, which is included among the certificate(s), with the VPN profile, which configures the device to use the specified certificate to authenticate the user to the VPN in accordance with the configuration of the VPN. For example, execution logic 608 may configure the device to utilize the VPN to access the private computer network.

In yet another example embodiment, the triggering event indicates that the device is to be configured to utilize an email program. In accordance with this embodiment, the method of flowchart 400 further includes providing an email profile to the device. For example, execution logic 608 may provide the email profile to the device. The email profile specifies a configuration of the email program. The configuration of the email program indicates that a certificate is to be used to authenticate the user to the email program. In further accordance with this embodiment, the method of flowchart 400 further includes configuring the device to utilize the email program by associating a specified certificate, which is included among the certificate(s), with the email profile, which configures the device to use the specified certificate to authenticate the user to the email program in accordance with the configuration of the email program. For example, execution logic 608 may configure the device to utilize the email program. It will be recognized that the device may be configured to use the specified certificate or other certificate(s) to sign and/or encrypt emails. For instance, the device may be notified that such certificate(s) are to be used to sign and/or encrypt emails. Any certificates that the device is configured to use with regard to the email program may be configured to comply with the Secure/Multipurpose Internet Mail Extensions (S/MIME) standard.

It will be recognized that a relationship between a certificate (e.g., a profile thereof) and a device configuration profile (e.g., a WiFi profile, a VPN profile, or an email profile) may be codified. For instance, the relationship may be codified in an algorithm that is used to configure the device.

In still another example embodiment, the method of flowchart 400 includes initiating creation of a specified certificate, which is included among the certificate(s), in a first workflow that includes a first portion of the work that depends on a subset of the portions of the work that is used to create the specified certificate. For instance, execution logic 608 may initiate the creation of the specified certificate in the first workflow. In accordance with this embodiment, the method of flowchart 400 further includes utilizing the specified certificate for which creation was initiated in the first workflow, rather than initiating re-creation of the specified certificate, in a second workflow that includes a second portion of the work that depends on the subset of the portions of the work. For example, execution logic 608 may utilize the specified certificate for which creation was initiated in the first workflow, rather than initiating re-creation of the specified certificate, in the second workflow.

As shown in FIG. 5, the method of flowchart 500 begins at step 502. In step 502, the state of the designated certificate, which is included among the certificate(s), is monitored over time based at least in part on the designated certificate being created and delivered to the device and further based at least in part on metadata associated with the designated certificate. For instance, the metadata may indicate the state of the designated certificate. In an example implementation, determination logic 602 monitors the state of the designated certificate over time based at least in part on the designated certificate being created and delivered to the device and further based at least in part on certificate metadata 624 that is associated with the designated certificate. For instance, determination logic 602 may monitor the state of the designated certificate based at least in part on the certificate metadata 624 indicating the state of the designated certificate.

At step 504, a determination is made that portions of additional work are to be performed to change the state of the designated certificate from a first state to a pre-defined second state. The determination is made based at least in part on the metadata associated with the designated certificate indicating that the designated certificate is in the first state and further based at least in part on the metadata associated with the designated certificate indicating that one or more criteria for changing the state of the designated certificate from the first state to the pre-defined second state are satisfied. For instance, the determination may be made based at least in part on configuration changes made by an IT administrator. The additional work may include renewing, revoking, auditing, and/or reporting the designated certificate. In an example implementation, determination logic 602 determines the portions of the additional work that are to be performed to change the state of the designated certificate from the first state to the pre-defined second state based at least in part on the certificate metadata 624 indicating that the designated certificate is in the first state and further based at least in part on the certificate metadata 624 indicating that the one or more criteria for changing the state of the designated certificate from the first state to the pre-defined second state are satisfied. In accordance with this implementation, determination logic 602 may generate the work indicator 614, which indicates the portions of the additional work that are to be performed.

At step 506, the additional asynchronous work requests are generated. The additional asynchronous work requests configured to, when executed, initiate performance of the respective portions of the additional work. In an example implementation, request logic 604 generates the additional asynchronous work requests. For instance, the additional asynchronous work requests may be included among the asynchronous work requests 616. In accordance with this implementation, request logic 604 may generate the additional asynchronous work requests 616 based at least in part on receipt of the work indicator 614 (e.g., based at least in part on the work indicator 614 indicating the portions of the additional work that are to be performed).

At step 508, a second hierarchical work tree is generated. The second hierarchical work tree includes second hierarchical nodes that represent the respective portions of the additional work. The second hierarchical work tree defines an order in which the portions of the additional work are to be performed based at least in part on second rules that indicate conditions under which the portions of the additional work are to be performed. In an example implementation, tree logic 606 generates the second hierarchical work tree. In accordance with this implementation, tree logic 606 may generate the second hierarchical work tree based at least in part on receipt of the work indicator 614 (e.g., based at least in part on the work indicator 614 indicating the portions of the additional work that are to be performed). For example, tree logic 606 may analyze the portions of the additional work that are indicated by the work indicator 614 to determine dependencies among the portions of the additional work. In accordance with this example, tree logic 606 may determine each portion of the additional work that has a dependency and the portion of the additional work on which that portion has the dependency. In further accordance with this example, tree logic 606 may determine the order in which the portions of the additional work are to be performed based at least in part on the dependencies that are determined by tree logic 606. For instance, the rules may indicate that each portion of the additional work that has a dependency on another portion of the additional work must not be performed until the other portion of the additional work is performed. Accordingly, tree logic 606 may apply the rule to the portions of the additional work based at least in part on knowledge of the dependencies to determine the order in which the portions of the additional work are to be performed. Tree logic 606 may arrange the nodes of the second hierarchical work tree to reflect the order.

At step 510, the additional asynchronous work requests are executed in the order defined by the second hierarchical work tree, which changes the state of the designated certificate from the first state to the pre-defined second state. In an example implementation, execution logic 608 executes the additional asynchronous work requests in the order that is defined by the second hierarchical work tree.

In an example embodiment, the first state is characterized by the designated certificate being expired or going to expire within a threshold period of time, and the pre-defined second state is characterized by the designated certificate being renewed. In accordance with this embodiment, determining that the portions of the additional work are to be performed at steep 504 is based at least in part on the metadata associated with the designated certificate indicating that the designated certificate is expired or is going to expire within the threshold period of time and further based at least in part on the metadata associated with the designated certificate indicating that the one or more criteria for renewing the designated certificate are satisfied. In further accordance with this embodiment, executing the additional asynchronous work requests at step 510 causes the designated certificate to be renewed.

It will be recognized that expired certificates may be maintained (e.g., stored) on the device and/or on other device(s). For instance, maintaining the expired certificates in this manner may enable emails that were encrypted with the expired certificates to be retrieved and read.

In another example embodiment, the first state is characterized by the designated certificate being available for use by the device, and the pre-defined second state is characterized by the designated certificate being revoked. In accordance with this embodiment, determining that the portions of the additional work are to be performed at steep 504 is based at least in part on the metadata associated with the designated certificate indicating that the designated certificate is available for use by the device and further based at least in part on the metadata associated with the designated certificate indicating that the one or more criteria for revoking the designated certificate are satisfied. In further accordance with this embodiment, executing the additional asynchronous work requests at step 510 causes the designated certificate to be revoked.

In some example embodiments, one or more steps 502, 504, 506, 508, and/or 510 of flowchart 500 may not be performed. Moreover, steps in addition to or in lieu of steps 502, 504, 506, 508, and/or 510 may be performed.

It will be recognized that the computing system 600 may not include one or more of determination logic 602, request logic 604, tree logic 606, execution logic 608, and/or hierarchical work ordering logic 610. Furthermore, the computing system 600 may include components in addition to or in lieu of determination logic 602, request logic 604, tree logic 606, execution logic 608, and/or hierarchical work ordering logic 610.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods. It will be recognized that portions of work that are represented by respective hierarchical nodes of a hierarchical work tree are to be performed in the order defined by the hierarchical work tree. Accordingly, asynchronous work requests that are configured to, when executed, initiate performance of the respective portions of the work are to be executed in the order defined by the hierarchical work tree.

Any one or more of client-side hierarchical work ordering logic 110A, server-side hierarchical work ordering logic 110B, certificate generator 112, hierarchical work ordering logic 210, certificate generator 212, configuration logic 214, CMS 216, work processor 218, determination logic 602, request logic 604, tree logic 606, execution logic 608, hierarchical work ordering logic 610, activity diagram 200, flowchart 400, and/or flowchart 500 may be implemented in hardware, software, firmware, or any combination thereof.

For example, any one or more of client-side hierarchical work ordering logic 110A, server-side hierarchical work ordering logic 110B, certificate generator 112, hierarchical work ordering logic 210, certificate generator 212, configuration logic 214, CMS 216, work processor 218, determination logic 602, request logic 604, tree logic 606, execution logic 608, hierarchical work ordering logic 610, activity diagram 200, flowchart 400, and/or flowchart 500 may be implemented, at least in part, as computer program code configured to be executed in one or more processors.

In another example, any one or more of client-side hierarchical work ordering logic 110A, server-side hierarchical work ordering logic 110B, certificate generator 112, hierarchical work ordering logic 210, certificate generator 212, configuration logic 214, CMS 216, work processor 218, determination logic 602, request logic 604, tree logic 606, execution logic 608, hierarchical work ordering logic 610, activity diagram 200, flowchart 400, and/or flowchart 500 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

An example system comprises a memory and one or more processors coupled to the memory. The one or more processors are configured to determine a plurality of portions of work that are to be performed to configure a device to have one or more certificates based at least in part on a triggering event that indicates that the device is to be configured. The one or more processors are further configured to generate a plurality of asynchronous work requests that are configured to, when executed, initiate performance of the respective portions of the work. The one or more processors are further configured to generate a hierarchical work tree that includes a plurality of hierarchical nodes that represent the respective portions of the work. The hierarchical work tree defines an order in which the portions of the work are to be performed based at least in part on rules that indicate conditions under which the portions of the work are to be performed. The one or more processors are further configured to execute the asynchronous work requests in the order defined by the hierarchical work tree, which initiates creation of the one or more certificates and delivery of the one or more certificates to the device.

In a first aspect of the example system, the one or more processors are configured to determine a plurality of subsets of the work that are to be performed to configure the device to have a plurality of respective certificates based at least in part on the triggering event, each subset of the work including multiple portions of the work. In accordance with the first aspect, the hierarchical work tree defines an order in which the subsets of the work are to be performed based at least in part on the rules that indicate conditions under which the subsets of the work are to be performed.

In an implementation of the first aspect of the example system, the one or more processors are configured to determine a first subset of the work that is to be performed to configure the device to have a first certificate. In accordance with this implementation, the one or more processors are configured to determine a second subset of the work that is to be performed to configure the device to have a second certificate. In further accordance with this implementation, the rules indicate that performance of portions of the work that are included in the first subset is to be initiated after performance of portions of the work that are included in the second subset is completed based at least in part on the first subset being dependent on the second subset.

In a second aspect of the example system, the one or more processors are configured to determine designated portions of the work that are to be performed to configure the device to have a designated certificate based at least in part on the triggering event. In accordance with the second aspect, the one or more processors are configured to generate designated asynchronous work requests that are configured to, when executed, initiate performance of the respective designated portions of the work. In further accordance with the second aspect, a specified asynchronous work request, which is included among the designated asynchronous work requests, is configured to, when executed, initiate notification of a user of the device that an action is to be performed by the user based at least in part on performance of the action being a pre-requisite to creation of the designated certificate. In further accordance with the second aspect, the one or more processors are further configured to discontinue execution of the designated asynchronous work requests to await performance of the action. In further accordance with the second aspect, the one or more processors are further configured to resume the execution of the designated asynchronous work requests based at least in part on the performance of the action, wherein the execution of the designated asynchronous work requests initiates the creation of the designated certificate and delivery of the designated certificate to the device. The second aspect of the example system may be implemented in combination with the first aspect of the example system, though the example embodiments are not limited in this respect.

In a third aspect of the example system, the one or more processors are further configured to monitor a state of a designated certificate, which is included among the one or more certificates, over time based at least in part on the designated certificate being created and delivered to the device and further based at least in part on metadata associated with the designated certificate. In accordance with the third aspect, the one or more processors are further configured to determine that a plurality of portions of additional work are to be performed to change the state of the designated certificate from a first state to a pre-defined second state based at least in part on the metadata associated with the designated certificate indicating that the designated certificate is in the first state and further based at least in part on the metadata associated with the designated certificate indicating that one or more criteria for changing the state of the designated certificate from the first state to the pre-defined second state are satisfied. In further accordance with the third aspect, the one or more processors are further configured to generate a plurality of additional asynchronous work requests that are configured to, when executed, initiate performance of the respective portions of the additional work. In further accordance with the third aspect, the one or more processors are further configured to generate a second hierarchical work tree that includes a plurality of second hierarchical nodes that represent the respective portions of the additional work. The second hierarchical work tree defines an order in which the portions of the additional work are to be performed based at least in part on second rules that indicate conditions under which the portions of the additional work are to be performed. In further accordance with the third aspect, the one or more processors are further configured to execute the additional asynchronous work requests in the order defined by the second hierarchical work tree, which changes the state of the designated certificate from the first state to the pre-defined second state. The third aspect of the example system may be implemented in combination with the first and/or second aspect of the example system, though the example embodiments are not limited in this respect.

In a first implementation of the third aspect of the example system, the one or more processors are configured to determine that the plurality of portions of the additional work are to be performed to change the state of the designated certificate from the first state in which the designated certificate is expired or to be expired to the pre-defined second state in which the designated certificate is renewed based at least in part on the metadata associated with the designated certificate indicating that the designated certificate is expired or to be expired and further based at least in part on the metadata associated with the designated certificate indicating that the one or more criteria for renewing the designated certificate are satisfied. In accordance with this implementation, the one or more processors are configured to cause the designated certificate to be renewed by executing the additional asynchronous work requests.

In a second implementation of the third aspect of the example system, the one or more processors are configured to determine that the plurality of portions of the additional work are to be performed to change the state of the designated certificate from the first state in which the designated certificate is available for use by the device to the pre-defined second state in which the designated certificate is revoked based at least in part on the metadata associated with the designated certificate indicating that the designated certificate is available for use by the device and further based at least in part on the metadata associated with the designated certificate indicating that the one or more criteria for revoking the designated certificate are satisfied. In accordance with this implementation, the one or more processors are configured to cause the designated certificate to be revoked by executing the additional asynchronous work requests.

In a fourth aspect of the example system, the triggering event indicates that the device is to be configured to access a WiFi network. In accordance with the fourth aspect, the one or more processors are further configured to provide a WiFi profile to the device. The WiFi profile specifies configuration settings that the device is configured to utilize to access the WiFi network. The configuration settings indicate that a certificate is to be used to authenticate the user to the WiFi network. In further accordance with the fourth aspect, the one or more processors are further configured to configure the device to access the WiFi network by associating a specified certificate of the one or more certificates with the WiFi profile, which configures the device to use the specified certificate to authenticate the user to the WiFi network in accordance with the configuration settings. The fourth aspect of the example system may be implemented in combination with the first, second, and/or third aspect of the example system, though the example embodiments are not limited in this respect.

In a fifth aspect of the example system, the triggering event indicates that the device is to be configured to utilize a virtual private network (VPN) to access a private computer network. In accordance with the fifth aspect, the one or more processors are further configured to provide a VPN profile to the device. The VPN profile specifies a configuration of the VPN. The configuration of the VPN indicates that a certificate is to be used to authenticate the user to the VPN. In accordance with the fifth aspect, the one or more processors are further configured to configure the device to utilize the VPN to access the private computer network by associating a specified certificate of the one or more certificates with the VPN profile, which configures the device to use the specified certificate to authenticate the user to the VPN in accordance with the configuration of the VPN. The fifth aspect of the example system may be implemented in combination with the first, second, third, and/or fourth aspect of the example system, though the example embodiments are not limited in this respect.

In a sixth aspect of the example system, the triggering event indicates that the device is to be configured to utilize an email program. In accordance with the sixth aspect, the one or more processors are further configured to provide an email profile to the device. The email profile specifies a configuration of the email program. The configuration of the email program indicates that a certificate is to be used to authenticate the user to the email program. In further accordance with the sixth aspect, the one or more processors are further configured to configure the device to utilize the email program by associating a specified certificate of the one or more certificates with the email profile, which configures the device to use the specified certificate to authenticate the user to the email program in accordance with the configuration of the email program. The sixth aspect of the example system may be implemented in combination with the first, second, third, fourth, and/or fifth aspect of the example system, though the example embodiments are not limited in this respect.

In a seventh aspect of the example system, the one or more processors are configured to initiate creation of a specified certificate of the one or more certificates in a first workflow that includes a first portion of the work that depends on a subset of the portions of the work that is used to create the specified certificate. In accordance with the seventh aspect, the one or more processors are configured to utilize the specified certificate for which creation was initiated in the first workflow, rather than initiating re-creation of the specified certificate, in a second workflow that includes a second portion of the work that depends on the subset of the portions of the work. The seventh aspect of the example system may be implemented in combination with the first, second, third, fourth, fifth, and/or sixth aspect of the example system, though the example embodiments are not limited in this respect.

In an example method, a plurality of portions of work that are to be performed to configure a device to have one or more certificates are determined based at least in part on a triggering event that indicates that the device is to be configured. A plurality of asynchronous work requests that are configured to, when executed, initiate performance of the respective portions of the work are generated. A hierarchical work tree that includes a plurality of hierarchical nodes that represent the respective portions of the work is generated. The hierarchical work tree defines an order in which the portions of the work are to be performed based at least in part on rules that indicate conditions under which the portions of the work are to be performed. The asynchronous work requests are executed in the order defined by the hierarchical work tree, which initiates creation of the one or more certificates and delivery of the one or more certificates to the device.

In a first aspect of the example method, determining the plurality of portions of the work comprises determining a plurality of subsets of the work that are to be performed to configure the device to have a plurality of respective certificates based at least in part on the triggering event, each subset of the work including multiple portions of the work. In accordance with the first aspect, the hierarchical work tree defines an order in which the subsets of the work are to be performed based at least in part on the rules that indicate conditions under which the subsets of the work are to be performed.

In an implementation of the first aspect of the example method, determining the subsets of the work comprises determining a first subset of the work that is to be performed to configure the device to have a first certificate and determining a second subset of the work that is to be performed to configure the device to have a second certificate. In accordance with this implementation, the rules indicate that performance of portions of the work that are included in the first subset is to be initiated after performance of portions of the work that are included in the second subset is completed based at least in part on the first subset being dependent on the second subset.

In a second aspect of the example method, determining the plurality of portions of the work comprises determining designated portions of the work that are to be performed to configure the device to have a designated certificate based at least in part on the triggering event. In accordance with the second aspect, generating the plurality of asynchronous work requests comprises generating designated asynchronous work requests that are configured to, when executed, initiate performance of the respective designated portions of the work. In further accordance with the second aspect, a specified asynchronous work request, which is included among the designated asynchronous work requests, is configured to, when executed, initiate notification of a user of the device that an action is to be performed by the user based at least in part on performance of the action being a pre-requisite to creation of the designated certificate. In further accordance with the second aspect, executing the asynchronous work requests in the order comprises discontinuing execution of the designated asynchronous work requests to await performance of the action. In further accordance with the second aspect, executing the asynchronous work requests in the order comprises resuming the execution of the designated asynchronous work requests based at least in part on the performance of the action. In further accordance with the second aspect, the execution of the designated asynchronous work requests initiates the creation of the designated certificate and delivery of the designated certificate to the device. The second aspect of the example method may be implemented in combination with the first aspect of the example method, though the example embodiments are not limited in this respect.

In a third aspect of the example method, the example method further comprises monitoring a state of a designated certificate, which is included among the one or more certificates, over time based at least in part on the designated certificate being created and delivered to the device and further based at least in part on metadata associated with the designated certificate. In accordance with the third aspect, the example method further comprises determining that a plurality of portions of additional work are to be performed to change the state of the designated certificate from a first state to a pre-defined second state based at least in part on the metadata associated with the designated certificate indicating that the designated certificate is in the first state and further based at least in part on the metadata associated with the designated certificate indicating that one or more criteria for changing the state of the designated certificate from the first state to the pre-defined second state are satisfied. In further accordance with the third aspect, the example method further comprises generating a plurality of additional asynchronous work requests that are configured to, when executed, initiate performance of the respective portions of the additional work. In further accordance with the third aspect, the example method further comprises generating a second hierarchical work tree that includes a plurality of second hierarchical nodes that represent the respective portions of the additional work. The second hierarchical work tree defines an order in which the portions of the additional work are to be performed based at least in part on second rules that indicate conditions under which the portions of the additional work are to be performed. In further accordance with the third aspect, the example method further comprises executing the additional asynchronous work requests in the order defined by the second hierarchical work tree, which changes the state of the designated certificate from the first state to the pre-defined second state. The third aspect of the example method may be implemented in combination with the first and/or second aspect of the example method, though the example embodiments are not limited in this respect.

In a first implementation of the third aspect of the example method, determining that the plurality of portions of the additional work are to be performed comprises determining that the plurality of portions of the additional work are to be performed to change the state of the designated certificate from the first state in which the designated certificate is expired or to be expired to the pre-defined second state in which the designated certificate is renewed based at least in part on the metadata associated with the designated certificate indicating that the designated certificate is expired or to be expired and further based at least in part on the metadata associated with the designated certificate indicating that the one or more criteria for renewing the designated certificate are satisfied. In accordance with the first implementation, executing the additional asynchronous work requests causes the designated certificate to be renewed.

In a second implementation of the third aspect of the example method, determining that the plurality of portions of the additional work are to be performed comprises determining that the plurality of portions of the additional work are to be performed to change the state of the designated certificate from the first state in which the designated certificate is available for use by the device to the pre-defined second state in which the designated certificate is revoked based at least in part on the metadata associated with the designated certificate indicating that the designated certificate is available for use by the device and further based at least in part on the metadata associated with the designated certificate indicating that the one or more criteria for revoking the designated certificate are satisfied. In accordance with the second implementation, executing the additional asynchronous work requests causes the designated certificate to be revoked.

In a fourth aspect of the example method, the triggering event indicates that the device is to be configured to access a WiFi network. In accordance with the fourth aspect, the example method further comprises providing a WiFi profile to the device. The WiFi profile specifies configuration settings that the device is configured to utilize to access the WiFi network. The configuration settings indicate that a certificate is to be used to authenticate the user to the WiFi network. In further accordance with the fourth aspect, the example method further comprises configuring the device to access the WiFi network by associating a specified certificate of the one or more certificates with the WiFi profile, which configures the device to use the specified certificate to authenticate the user to the WiFi network in accordance with the configuration settings. The fourth aspect of the example method may be implemented in combination with the first, second, and/or third aspect of the example method, though the example embodiments are not limited in this respect.

In a fifth aspect of the example method, the triggering event indicates that the device is to be configured to utilize a virtual private network (VPN) to access a private computer network. In accordance with the fifth aspect, the example method further comprises providing a VPN profile to the device. The VPN profile specifies a configuration of the VPN. The configuration of the VPN indicates that a certificate is to be used to authenticate the user to the VPN. In further accordance with the fifth aspect, the example method further comprises configuring the device to utilize the VPN to access the private computer network by associating a specified certificate of the one or more certificates with the VPN profile, which configures the device to use the specified certificate to authenticate the user to the VPN in accordance with the configuration of the VPN. The fifth aspect of the example method may be implemented in combination with the first, second, third, and/or fourth aspect of the example method, though the example embodiments are not limited in this respect.

In a sixth aspect of the example method, the triggering event indicates that the device is to be configured to utilize an email program. In accordance with the sixth aspect, the example method further comprises providing an email profile to the device. The email profile specifies a configuration of the email program. The configuration of the email program indicates that a certificate is to be used to authenticate the user to the email program. In further accordance with the sixth aspect, the example method further comprises configuring the device to utilize the email program by associating a specified certificate of the one or more certificates with the email profile, which configures the device to use the specified certificate to authenticate the user to the email program in accordance with the configuration of the email program. The sixth aspect of the example method may be implemented in combination with the first, second, third, fourth, and/or fifth aspect of the example method, though the example embodiments are not limited in this respect.

In a seventh aspect of the example method, the example method comprises initiating creation of a specified certificate of the one or more certificates in a first workflow that includes a first portion of the work that depends on a subset of the portions of the work that is used to create the specified certificate. In accordance with the seventh aspect, the example method comprises utilizing the specified certificate for which creation was initiated in the first workflow, rather than initiating re-creation of the specified certificate, in a second workflow that includes a second portion of the work that depends on the subset of the portions of the work. The seventh aspect of the example method may be implemented in combination with the first, second, third, fourth, fifth, and/or sixth aspect of the example method, though the example embodiments are not limited in this respect.

An example computer program product comprises a computer-readable storage medium having instructions recorded thereon for enabling a processor-based system to perform operations. The operations comprise determining a plurality of portions of work that are to be performed to configure a device to have one or more certificates based at least in part on a triggering event that indicates that the device is to be configured. The operations further comprise generating a plurality of asynchronous work requests that are configured to, when executed, initiate performance of the respective portions of the work. The operations further comprise generating a hierarchical work tree that includes a plurality of hierarchical nodes that represent the respective portions of the work. The hierarchical work tree defines an order in which the portions of the work are to be performed based at least in part on rules that indicate conditions under which the portions of the work are to be performed. The operations further comprise initiating creation of the one or more certificates and delivery of the one or more certificates to the device to configure the device by executing the asynchronous work requests in the order defined by the hierarchical work tree.

IV. Example Computer System

Figure 7:
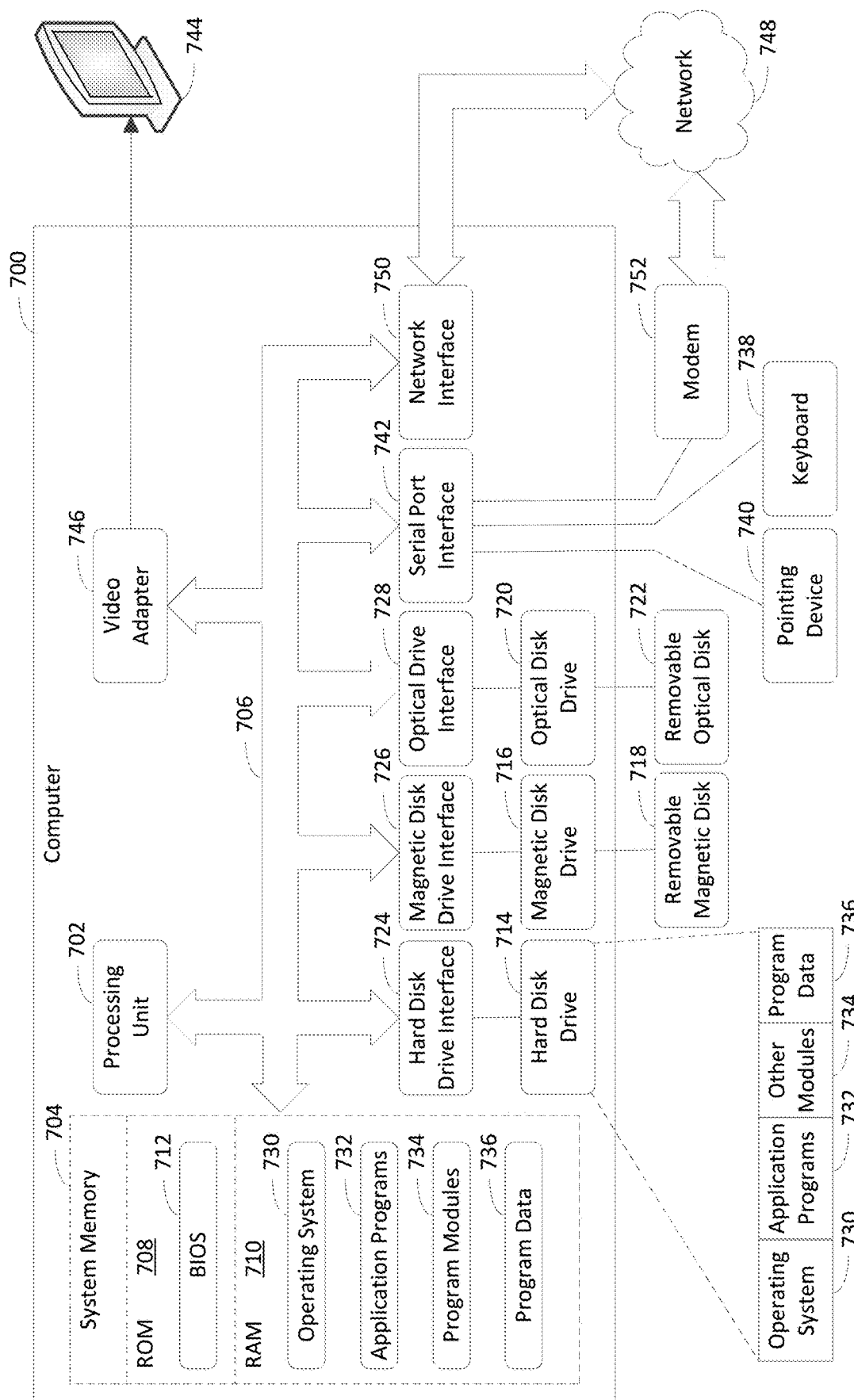
FIG. 7 depicts an example computer in which embodiments may be implemented.

FIG. 7 depicts an example computer 700 in which embodiments may be implemented. Any one or more of user devices 102A-102M, any one or more of servers 106A-106N, and/or admin system 108 shown in FIG. 1; client device 202 shown in FIG. 2; and/or computing system 600 shown in FIG. 6 may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing any one or more of (e.g., at least a portion of) client-side hierarchical work ordering logic 110A, server-side hierarchical work ordering logic 110B, certificate generator 112, hierarchical work ordering logic 210, certificate generator 212, configuration logic 214, CMS 216, work processor 218, determination logic 602, request logic 604, tree logic 606, execution logic 608, hierarchical work ordering logic 610, activity diagram 200 (including any activity of activity diagram 200), flowchart 400 (including any step of flowchart 400), and/or flowchart 500 (including any step of flowchart 500), as described herein.

A user may enter commands and information into the computer 700 through input devices such as keyboard 738 and pointing device 740. Other input devices (not shown) may include a microphone, joystick, game pad, satellite dish, scanner, touch screen, camera, accelerometer, gyroscope, or the like. These and other input devices are often connected to the processing unit 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable storage medium" are used to generally refer to media (e.g., non-transitory media) such as the hard disk associated with hard disk drive 714, removable magnetic disk 718, removable optical disk 722, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of embodiments discussed herein. Accordingly, such computer programs represent controllers of the computer 700.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
   memory; and
   one or more processors coupled to the memory, the one or more processors configured to:
      determine a plurality of portions of work that are to be performed to configure a device to have one or more certificates based at least in part on a triggering event that indicates that the device is to be configured;
      generate a plurality of asynchronous work requests that are configured to, when executed, initiate performance of the respective portions of the work;
      generate a hierarchical work tree that includes a plurality of hierarchical nodes that represent the respective portions of the work, the hierarchical work tree defining an order in which the portions of the work are to be performed based at least in part on rules that indicate conditions under which the portions of the work are to be performed; and
      execute the asynchronous work requests in the order defined by the hierarchical work tree, which initiates creation of the one or more certificates and delivery of the one or more certificates to the device.

2. The system of claim 1, wherein the one or more processors are configured to:
   determine a plurality of subsets of the work that are to be performed to configure the device to have a plurality of respective certificates based at least in part on the triggering event, each subset of the work including multiple portions of the work; and
   wherein the hierarchical work tree defines an order in which the subsets of the work are to be performed based at least in part on the rules that indicate conditions under which the subsets of the work are to be performed.

3. The system of claim 2, wherein the one or more processors are configured to:
   determine a first subset of the work that is to be performed to configure the device to have a first certificate; and
   determine a second subset of the work that is to be performed to configure the device to have a second certificate; and
   wherein the rules indicate that performance of portions of the work that are included in the first subset is to be initiated after performance of portions of the work that are included in the second subset is completed based at least in part on the first subset being dependent on the second subset.

4. The system of claim 1, wherein the one or more processors are configured to:
   determine designated portions of the work that are to be performed to configure the device to have a designated certificate based at least in part on the triggering event;
   generate designated asynchronous work requests that are configured to, when executed, initiate performance of the respective designated portions of the work, wherein a specified asynchronous work request, which is included among the designated asynchronous work requests, is configured to, when executed, initiate notification of a user of the device that an action is to be performed by the user based at least in part on performance of the action being a pre-requisite to creation of the designated certificate;
   discontinue execution of the designated asynchronous work requests to await performance of the action; and
   resume the execution of the designated asynchronous work requests based at least in part on the performance of the action, wherein the execution of the designated asynchronous work requests initiates the creation of the designated certificate and delivery of the designated certificate to the device.

5. The system of claim 1, wherein the one or more processors are further configured to:
   monitor a state of a designated certificate, which is included among the one or more certificates, over time based at least in part on the designated certificate being created and delivered to the device and further based at least in part on metadata associated with the designated certificate;
   determine that a plurality of portions of additional work are to be performed to change the state of the designated certificate from a first state to a pre-defined second state based at least in part on the metadata associated with the designated certificate indicating that the designated certificate is in the first state and further based at least in part on the metadata associated with the designated certificate indicating that one or more criteria for changing the state of the designated certificate from the first state to the pre-defined second state are satisfied;

generate a plurality of additional asynchronous work requests that are configured to, when executed, initiate performance of the respective portions of the additional work;

generate a second hierarchical work tree that includes a plurality of second hierarchical nodes that represent the respective portions of the additional work, the second hierarchical work tree defining an order in which the portions of the additional work are to be performed based at least in part on second rules that indicate conditions under which the portions of the additional work are to be performed; and execute the additional asynchronous work requests in the order defined by the second hierarchical work tree, which changes the state of the designated certificate from the first state to the pre-defined second state.

6. The system of claim 5, wherein the one or more processors are configured to:

determine that the plurality of portions of the additional work are to be performed to change the state of the designated certificate from the first state in which the designated certificate is expired or to be expired to the pre-defined second state in which the designated certificate is renewed based at least in part on the metadata associated with the designated certificate indicating that the designated certificate is expired or to be expired and further based at least in part on the metadata associated with the designated certificate indicating that the one or more criteria for renewing the designated certificate are satisfied; and cause the designated certificate to be renewed by executing the additional asynchronous work requests.

7. The system of claim 5, wherein the one or more processors are configured to:

determine that the plurality of portions of the additional work are to be performed to change the state of the designated certificate from the first state in which the designated certificate is available for use by the device to the pre-defined second state in which the designated certificate is revoked based at least in part on the metadata associated with the designated certificate indicating that the designated certificate is available for use by the device and further based at least in part on the metadata associated with the designated certificate indicating that the one or more criteria for revoking the designated certificate are satisfied; and cause the designated certificate to be revoked by executing the additional asynchronous work requests.

8. The system of claim 1, wherein the triggering event indicates that the device is to be configured to access a WiFi network; and wherein the one or more processors are further configured to:

provide a WiFi profile to the device, the WiFi profile specifying configuration settings that the device is configured to utilize to access the WiFi network, the configuration settings indicating that a certificate is to be used to authenticate the user to the WiFi network; and configure the device to access the WiFi network by associating a specified certificate of the one or more certificates with the WiFi profile, which configures the device to use the specified certificate to authenticate the user to the WiFi network in accordance with the configuration settings.

9. The system of claim 1, wherein the triggering event indicates that the device is to be configured to utilize a virtual private network (VPN) to access a private computer network; and wherein the one or more processors are further configured to:

provide a VPN profile to the device, the VPN profile specifying a configuration of the VPN, the configuration of the VPN indicating that a certificate is to be used to authenticate the user to the VPN; and configure the device to utilize the VPN to access the private computer network by associating a specified certificate of the one or more certificates with the VPN profile, which configures the device to use the specified certificate to authenticate the user to the VPN in accordance with the configuration of the VPN.

10. The system of claim 1, wherein the triggering event indicates that the device is to be configured to utilize an email program; and wherein the one or more processors are further configured to:

provide an email profile to the device, the email profile specifying a configuration of the email program, the configuration of the email program indicating that a certificate is to be used to authenticate the user to the email program; and configure the device to utilize the email program by associating a specified certificate of the one or more certificates with the email profile, which configures the device to use the specified certificate to authenticate the user to the email program in accordance with the configuration of the email program.

11. The system of claim 1, wherein the one or more processors are configured to:

initiate creation of a specified certificate of the one or more certificates in a first workflow that includes a first portion of the work that depends on a subset of the portions of the work that is used to create the specified certificate; and utilize the specified certificate for which creation was initiated in the first workflow, rather than initiating re-creation of the specified certificate, in a second workflow that includes a second portion of the work that depends on the subset of the portions of the work.

12. A method comprising:

determining a plurality of portions of work that are to be performed to configure a device to have one or more certificates based at least in part on a triggering event that indicates that the device is to be configured;

generating a plurality of asynchronous work requests that are configured to, when executed, initiate performance of the respective portions of the work;

generating a hierarchical work tree that includes a plurality of hierarchical nodes that represent the respective portions of the work, the hierarchical work tree defining an order in which the portions of the work are to be performed based at least in part on rules that indicate conditions under which the portions of the work are to be performed; and executing the asynchronous work requests in the order defined by the hierarchical work tree, which initiates creation of the one or more certificates and delivery of the one or more certificates to the device.

13. The method of claim 12, wherein determining the plurality of portions of the work comprises:

determining a plurality of subsets of the work that are to be performed to configure the device to have a plurality of respective certificates based at least in part on the triggering event, each subset of the work including multiple portions of the work; and wherein the hierarchical work tree defines an order in which the subsets of the work are to be performed based at least in part on the rules that indicate conditions under which the subsets of the work are to be performed.

14. The method of claim 13, wherein determining the subsets of the work comprises:

determining a first subset of the work that is to be performed to configure the device to have a first certificate; and determining a second subset of the work that is to be performed to configure the device to have a second certificate; and wherein the rules indicate that performance of portions of the work that are included in the first subset is to be initiated after performance of portions of the work that are included in the second subset is completed based at least in part on the first subset being dependent on the second subset.

15. The method of claim 12, wherein determining the plurality of portions of the work comprises:

determining designated portions of the work that are to be performed to configure the device to have a designated certificate based at least in part on the triggering event;

wherein generating the plurality of asynchronous work requests comprises:

generating designated asynchronous work requests that are configured to, when executed, initiate performance of the respective designated portions of the work;

wherein a specified asynchronous work request, which is included among the designated asynchronous work requests, is configured to, when executed, initiate notification of a user of the device that an action is to be performed by the user based at least in part on performance of the action being a pre-requisite to creation of the designated certificate; and wherein executing the asynchronous work requests in the order comprises:

discontinuing execution of the designated asynchronous work requests to await performance of the action; and resuming the execution of the designated asynchronous work requests based at least in part on the performance of the action, wherein the execution of the designated asynchronous work requests initiates the creation of the designated certificate and delivery of the designated certificate to the device.

16. The method of claim 12, further comprising:

monitoring a state of a designated certificate, which is included among the one or more certificates, over time based at least in part on the designated certificate being created and delivered to the device and further based at least in part on metadata associated with the designated certificate;

determining that a plurality of portions of additional work are to be performed to change the state of the designated certificate from a first state to a pre-defined second state based at least in part on the metadata associated with the designated certificate indicating that the designated certificate is in the first state and further based at least in part on the metadata associated with the designated certificate indicating that one or more criteria for changing the state of the designated certificate from the first state to the pre-defined second state are satisfied;

generating a plurality of additional asynchronous work requests that are configured to, when executed, initiate performance of the respective portions of the additional work;

generating a second hierarchical work tree that includes a plurality of second hierarchical nodes that represent the respective portions of the additional work, the second hierarchical work tree defining an order in which the portions of the additional work are to be performed based at least in part on second rules that indicate conditions under which the portions of the additional work are to be performed; and executing the additional asynchronous work requests in the order defined by the second hierarchical work tree, which changes the state of the designated certificate from the first state to the pre-defined second state.

17. The method of claim 16, wherein determining that the plurality of portions of the additional work are to be performed comprises:

determining that the plurality of portions of the additional work are to be performed to change the state of the designated certificate from the first state in which the designated certificate is expired or to be expired to the pre-defined second state in which the designated certificate is renewed based at least in part on the metadata associated with the designated certificate indicating that the designated certificate is expired or to be expired and further based at least in part on the metadata associated with the designated certificate indicating that the one or more criteria for renewing the designated certificate are satisfied; and wherein executing the additional asynchronous work requests causes the designated certificate to be renewed.

18. The method of claim 16, wherein determining that the plurality of portions of the additional work are to be performed comprises:

determining that the plurality of portions of the additional work are to be performed to change the state of the designated certificate from the first state in which the designated certificate is available for use by the device to the pre-defined second state in which the designated certificate is revoked based at least in part on the metadata associated with the designated certificate indicating that the designated certificate is available for use by the device and further based at least in part on the metadata associated with the designated certificate indicating that the one or more criteria for revoking the designated certificate are satisfied; and wherein executing the additional asynchronous work requests causes the designated certificate to be revoked.

19. The method of claim 12, comprising:

initiating creation of a specified certificate of the one or more certificates in a first workflow that includes a first portion of the work that depends on a subset of the portions of the work that is used to create the specified certificate; and utilizing the specified certificate for which creation was initiated in the first workflow, rather than initiating re-creation of the specified certificate, in a second workflow that includes a second portion of the work that depends on the subset of the portions of the work.

20. A computer program product comprising a computer-readable storage medium having instructions recorded thereon for enabling a processor-based system to perform operations, the operations comprising:
- determining a plurality of portions of work that are to be performed to configure a device to have one or more certificates based at least in part on a triggering event that indicates that the device is to be configured;
- generating a plurality of asynchronous work requests that are configured to, when executed, initiate performance of the respective portions of the work;
- generating a hierarchical work tree that includes a plurality of hierarchical nodes that represent the respective portions of the work, the hierarchical work tree defining an order in which the portions of the work are to be performed based at least in part on rules that indicate conditions under which the portions of the work are to be performed; and
- initiating creation of the one or more certificates and delivery of the one or more certificates to the device to configure the device by executing the asynchronous work requests in the order defined by the hierarchical work tree.

* * * * *